US012482387B2

(12) United States Patent
Chen et al.

(10) Patent No.: US 12,482,387 B2
(45) Date of Patent: Nov. 25, 2025

(54) APPLICATION DISPLAY METHOD AND APPARATUS, SYSTEM-ON-A-CHIP, MEDIUM, AND PROGRAM PRODUCT

(71) Applicant: Huawei Technologies Co., Ltd., Shenzhen (CN)

(72) Inventors: Guangjun Chen, Wuhan (CN); Bo Wang, Wuhan (CN); Pei Zhu, Wuhan (CN); Zhangliang Xiong, Nanjing (CN); Yanan Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 261 days.

(21) Appl. No.: 18/274,359

(22) PCT Filed: Dec. 31, 2021

(86) PCT No.: PCT/CN2021/143961
§ 371 (c)(1),
(2) Date: Jul. 26, 2023

(87) PCT Pub. No.: WO2022/161110
PCT Pub. Date: Aug. 4, 2022

(65) Prior Publication Data
US 2024/0073313 A1 Feb. 29, 2024

(30) Foreign Application Priority Data

Jan. 27, 2021 (CN) .......................... 202110113616.X

(51) Int. Cl.
*G09G 3/00* (2006.01)
*G06F 1/16* (2006.01)
(Continued)

(52) U.S. Cl.
CPC .......... *G09G 3/035* (2020.08); *G06F 1/1616* (2013.01); *G06F 3/0488* (2013.01);
(Continued)

(58) Field of Classification Search
CPC ........... G06F 3/0346; G06F 2200/1614; G06F 2200/1637; G09G 3/035; G09G 2340/0442; G09G 2340/0492; G09G 2354/00
See application file for complete search history.

(56) References Cited

U.S. PATENT DOCUMENTS 9,001,047 B2 * 4/2015 Forstall ............... G06F 3/04845
345/173
10,254,846 B1 * 4/2019 Kinstner ............... G06F 3/0487
(Continued)

FOREIGN PATENT DOCUMENTS

CN 109684011 A 4/2019
CN 110244996 A 9/2019
(Continued)

*Primary Examiner* — Patrick F Marinelli
(74) *Attorney, Agent, or Firm* — Slater Matsil, LLP

(57) ABSTRACT

In accordance with an embodiment, an application display method includes: starting an application on an electronic device; detecting a switching operation of switching a screen orientation of the electronic device from a portrait orientation to a landscape orientation; in response to detecting the switching operation, changing a window orientation of display resource information of the application to the portrait orientation; and sending the changed display resource information to the application, so that the application loads a portrait layout of an application window in the landscape orientation.

17 Claims, 19 Drawing Sheets

(51) Int. Cl.
*G06F 3/0488* (2022.01)
*H04M 1/02* (2006.01)

(52) U.S. Cl.
CPC ... *H04M 1/0214* (2013.01); *G06F 2200/1614* (2013.01); *G09G 2340/0442* (2013.01); *G09G 2340/0492* (2013.01); *G09G 2354/00* (2013.01)

(56) References Cited

U.S. PATENT DOCUMENTS

| | | | |
|---|---|---|---|
| 10,620,701 B2* | 4/2020 | Siripurapu | G06F 3/011 |
| 11,887,557 B2* | 1/2024 | Wang | G06T 15/503 |
| 11,994,918 B2* | 5/2024 | Ran | G06F 1/1652 |
| 12,361,914 B2* | 7/2025 | Chen | G09G 5/14 |
| 2007/0004451 A1* | 1/2007 | C. Anderson | G06F 1/1626 |
| | | | 455/556.1 |
| 2008/0165152 A1* | 7/2008 | Forstall | G06F 1/1656 |
| | | | 345/173 |
| 2015/0009165 A1* | 1/2015 | Bychkov | G06F 1/1626 |
| | | | 345/173 |
| 2015/0145893 A1* | 5/2015 | Forstall | G06F 1/1656 |
| | | | 345/650 |
| 2016/0247484 A1* | 8/2016 | Chen | G06T 1/20 |
| 2017/0235365 A1* | 8/2017 | Siripurapu | G06F 3/015 |
| | | | 345/173 |
| 2022/0283610 A1* | 9/2022 | Ran | G06F 1/1652 |
| 2022/0358894 A1* | 11/2022 | Wang | G06T 15/503 |
| 2023/0315148 A1* | 10/2023 | Fang | G06F 1/3246 |
| | | | 345/659 |
| 2023/0410767 A1* | 12/2023 | Chen | G09G 3/36 |
| 2024/0073313 A1* | 2/2024 | Chen | G09G 3/035 |

FOREIGN PATENT DOCUMENTS

| | | |
|---|---|---|
| JP | 2014149860 A | 8/2014 |
| WO | 2017120894 A1 | 7/2017 |

* cited by examiner (a)

(b)

(c)

(d)

(a)

(b)

(c)

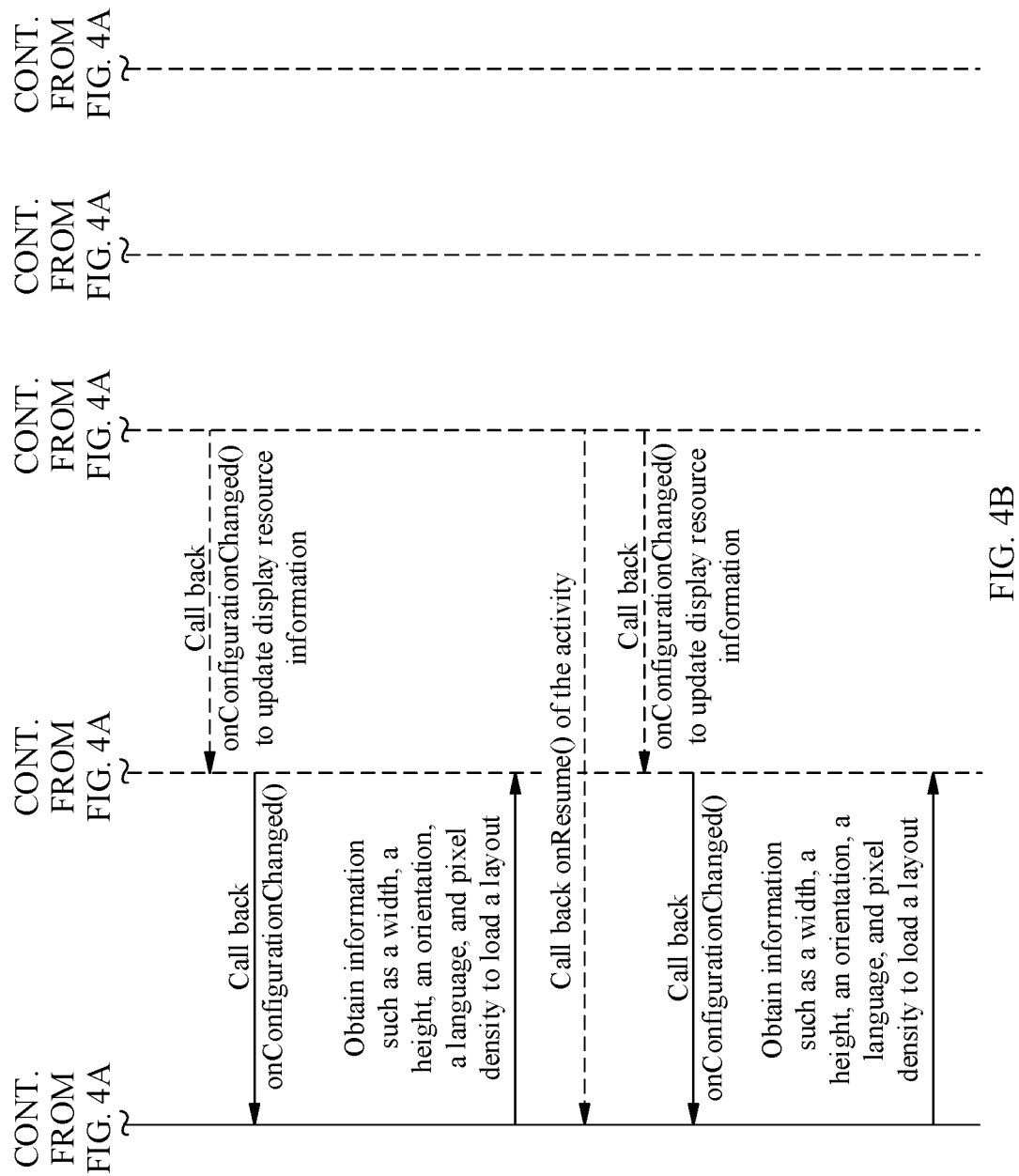

APPLICATION DISPLAY METHOD AND APPARATUS, SYSTEM-ON-A-CHIP, MEDIUM, AND PROGRAM PRODUCT

CROSS-REFERENCE TO RELATED APPLICATIONS

This application is a National Stage of International Patent Application No. PCT/CN2021/143961, filed on Dec. 31, 2021, which claims priority to Chinese Patent Application No. 202110113616.X, filed on Jan. 27, 2021, both of which are hereby incorporated by reference in their entireties.

TECHNICAL FIELD

Embodiments of this application relate to the field of electronic technologies, and in particular, to an application display method and apparatus, a system-on-a-chip, a medium, and a program product.

BACKGROUND

With continuous development of electronic devices, more electronic devices with display screens are widely applied to people's daily life and work. Currently, most applications are adapted to a portrait orientation for displaying, but are not adapted to a landscape orientation for displaying. When a screen orientation of an electronic device is the landscape orientation, an application cannot be adapted to the landscape orientation for displaying, and user experience is affected.

SUMMARY

Embodiments of this application provide an application display method and apparatus, a system-on-a-chip, a medium, and a program product, so that when a screen orientation of an electronic device is a landscape orientation, an interface of an application not adapted to the landscape orientation can be normally displayed.

According to a first aspect, an embodiment of this application provides an application display method, applied to an electronic device. The method includes: starting an application on the electronic device; detecting a switching operation of switching a screen orientation of the electronic device from a portrait orientation to a landscape orientation; changing, in response to the switching operation, a window orientation in display resource information of the application to the portrait orientation; and sending changed display resource information to the application, so that the application loads a portrait layout of an application window in the landscape orientation.

A status of the electronic device may include a landscape state and a portrait state. Correspondingly, the screen orientation of the electronic device may include the landscape orientation and the portrait orientation. A width of a display interface of a screen corresponding to the landscape orientation (that is, one side with a relatively small included angle between the display interface and a horizontal direction of the screen) is greater than a height of the display interface (that is, one side with a relatively small included angle between the display interface and a vertical direction of the screen). For example, when a horizontal width displayed by the electronic device is greater than a vertical height, the screen orientation is the landscape orientation. A width of a display interface of the screen corresponding to the portrait orientation (that is, one side with a relatively small included angle between the display interface and the horizontal direction of the screen) is less than a height of the display interface (that is, one side with a relatively small included angle between the display interface and the vertical direction of the screen). For example, when the horizontal width displayed by the electronic device is less than the vertical height, the screen orientation is the portrait orientation.

When the electronic device is in the landscape state, the screen orientation of the electronic device may be the landscape orientation or the portrait orientation. Correspondingly, when the electronic device is in the portrait state, the screen orientation of the electronic device may be the landscape orientation or the portrait orientation.

The electronic device may include a plurality of applications, and may simultaneously run the plurality of applications. The application may be a third-party application or a native application. One application may include a plurality of application windows. After one application is started, a plurality of application windows may be opened. A window orientation of an application window may include the landscape orientation and the portrait orientation. In a possible implementation, when the window orientation of the application window is the landscape orientation, the application loads a landscape layout. When the window orientation of the application window is the portrait orientation, the application loads the portrait layout. The layout may be used to indicate which icons are arranged in the application window, or used to indicate location information of each icon in the application window, or the like. If the landscape layout is different from the portrait layout, icons or location information of icons in an application interface displayed in the landscape layout may be different from those displayed in the portrait layout.

In this embodiment of this application, after the application on the electronic device is started, a user or another electronic device inputs a switching operation of switching the screen orientation of the electronic device from the portrait orientation to the landscape orientation, and the screen orientation of the electronic device is switched from the portrait orientation to the landscape orientation. If the application is not adapted to the landscape orientation for displaying, the application cannot be normally displayed in the landscape orientation. Therefore, according to the application display method in this application, the electronic device detects the switching operation, and changes, in response to the switching operation, the window orientation in the display resource information of the application to the portrait orientation. The application receives the changed display resource information sent by the electronic device, and refreshes and displays the application interface based on the changed display resource information. In other words, the application window loads the portrait layout of the application window in the portrait orientation to which the application is adapted, and does not need to load the landscape layout to which the application is not adapted, so that the application loads the portrait layout of the application window in the landscape orientation, thereby improving user experience.

With reference to the first aspect, in a possible design, the changing, in response to the switching operation, a window orientation in display resource information of the application to the portrait orientation further includes: switching, in response to the switching operation, the application window of the application to the landscape orientation for displaying.

In this embodiment of this application, an application window that is previously not adapted to a landscape orientation cannot be switched to the landscape orientation for displaying. Therefore, in the application display method in this application, in response to the switching operation, the application window of the application is switched to the landscape orientation for displaying, and the window orientation in the display resource information of the application is further changed to the portrait orientation, so that the portrait layout of the application window can be loaded in the landscape orientation.

With reference to the first aspect, in another possible design, before the response to the switching operation, the method further includes: determining whether an initial window orientation of the application is the portrait orientation; and if the initial window orientation of the application is the portrait orientation, changing the initial window orientation to a sensor orientation, so that the application window of the application is controlled to follow the screen orientation for displaying.

The initial window orientation of the application may be the landscape orientation, the portrait orientation, or the like. The initial window orientation corresponds to a window orientation of the application before the window orientation is changed. For example, a window orientation of the application, obtained before the switching operation is performed, is the initial window orientation of the application.

The window orientation of the application window may further include the sensor orientation. When the window orientation of the application window is the sensor orientation, the layout of the application window is determined by a sensor. For example, a SCREEN ORIENTATION SENSOR parameter is used to set the screen orientation of the electronic device to follow the sensor, and the screen orientation may be affected to 0°, 90°, 180°, or 270°. In this case, the window orientation of the application window may be the screen orientation. If the screen orientation is the landscape orientation, the window orientation is the landscape orientation, and the application window is switched to the landscape orientation for displaying. If the screen orientation is the portrait orientation, the window orientation is the portrait orientation, and the application window is switched to the landscape orientation for displaying.

In this embodiment of this application, the application window using the application display method in this application needs to be determined in this application. If the initial window orientation of the application window of the application is the landscape orientation, the application window may be displayed in the landscape orientation. In other words, the application window may load the landscape layout. In this case, the application window is not processed in this application. If the window orientation of the initial application window of the application is the portrait orientation, it is temporarily considered that the application window cannot be adapted to the landscape orientation, and further, the window orientation is changed to the sensor orientation, so that the application window of the application is controlled to follow the screen orientation for displaying. When the switching operation of switching the screen orientation of the electronic device from the portrait orientation to the landscape orientation is detected, the application window is also switched from the portrait orientation to the landscape orientation for displaying.

With reference to the first aspect, in another possible design, the changing a window orientation in display resource information of the application to the portrait orientation includes: determining whether the initial window orientation of the application is the portrait orientation; and if the initial window orientation of the application is the portrait orientation, changing the window orientation in the display resource information of the application to the portrait orientation.

In this embodiment of this application, before the initial window orientation of the application is changed to the portrait orientation, it is first determined whether the initial window orientation of the application is the portrait orientation. If the initial window orientation of the application is not the portrait orientation, the application display method provided in this embodiment of this application is not applicable. If the initial window orientation of the application is the portrait orientation, the initial window orientation of the application is changed to the portrait orientation.

With reference to the first aspect, in another possible design, the changing a window orientation in display resource information of the application to the portrait orientation includes: changing, by an activity manager service of the electronic device, the window orientation in the display resource information of the application to the portrait orientation; and sending the changed display resource information to a resource manager of the electronic device, so that the application obtains the changed display resource information from the resource manager.

With reference to the first aspect, in another possible design, the changing, by an activity manager service of the electronic device, the window orientation in the display resource information of the application to the portrait orientation includes: changing, by the activity manager service of the electronic device, a screen rotation value in the display resource information of the application to 0 degrees, and changing the screen orientation in the display resource information of the application to the portrait orientation.

With reference to the first aspect, in another possible design, the changing a window orientation in display resource information of the application to the portrait orientation further includes: changing, by the resource manager of the electronic device, the window orientation in the display resource information of the application to the portrait orientation; and sending the changed display resource information to the application.

With reference to the first aspect, in another possible design, the changing, by the resource manager of the electronic device, the window orientation in the display resource information of the application to the portrait orientation includes: changing, by the resource manager of the electronic device, the screen rotation value in the display resource information of the application to 0 degrees.

With reference to the first aspect, in another possible design, after the starting an application on the electronic device, the method further includes: determining whether the application is in a preset whitelist; and if the application is in the preset whitelist, obtaining the initial window orientation of the application.

According to a second aspect, an embodiment of this application provides an application display apparatus, applied to an electronic device including a display screen. The apparatus is configured to perform the method according to any one of the foregoing implementations.

According to a third aspect, an embodiment of this application provides a system-on-a-chip. The system-on-a-chip is applied to an electronic device including a display screen; the system-on-a-chip includes one or more interface circuits and one or more processors; the interface circuit and the processor are interconnected by using a line; the interface circuit is configured to receive a signal from a memory of the electronic device, and send the signal to the processor, where the signal includes computer instructions stored in the memory; and when the processor executes the computer instructions, the electronic device performs the method according to any one of the foregoing implementations.

According to a fourth aspect, an embodiment of this application provides a computer storage medium including computer instructions. When the computer instructions are run on an electronic device, the electronic device is enabled to perform the method according to any one of the foregoing implementations.

According to a fifth aspect, an embodiment of this application provides a computer program product. When the computer program product runs on a computer, the computer is enabled to perform the method according to any one of the foregoing implementations.

Technical effects achieved by the second aspect, the third aspect, the fourth aspect, and the fifth aspect are similar to technical effects achieved by corresponding technical means according to the first aspect. Details are not described herein again.

Beneficial effects brought by the technical solutions provided in this application include at least the following:

In the embodiments of this application, the window orientation in the display resource information of the application is changed to the portrait orientation. The application receives the changed display resource information sent by the electronic device, and refreshes and displays the application interface based on the changed display resource information. In other words, the application window loads the portrait layout of the application window in the portrait orientation to which the application is adapted, and does not need to load the landscape layout to which the application is not adapted. The application window of the application is switched to the landscape orientation for displaying, and the portrait layout may be loaded in the landscape orientation. In this way, use experience is improved.

BRIEF DESCRIPTION OF THE DRAWINGS

FIG. 4A and FIG. 4B are a schematic flowchart of an application display method according to an embodiment of this application;

REFERENCE NUMERALS

Figure 1:
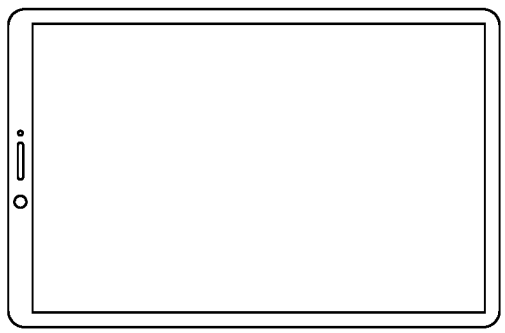
FIG. 1 is a schematic diagram of a landscape state and a portrait state of an electronic device according to an embodiment of this application.
Figure 1:
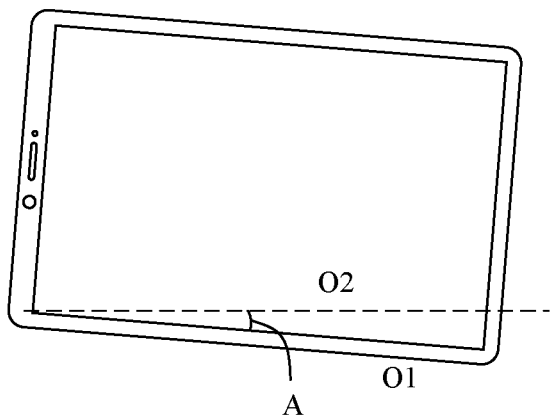
Figure 1:
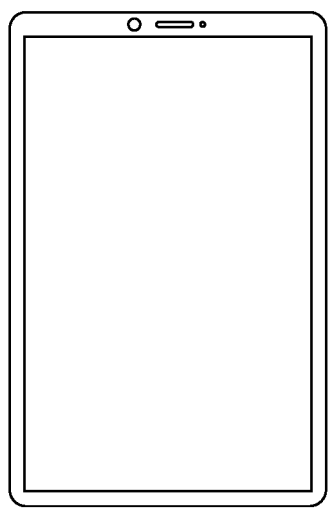
Figure 1:
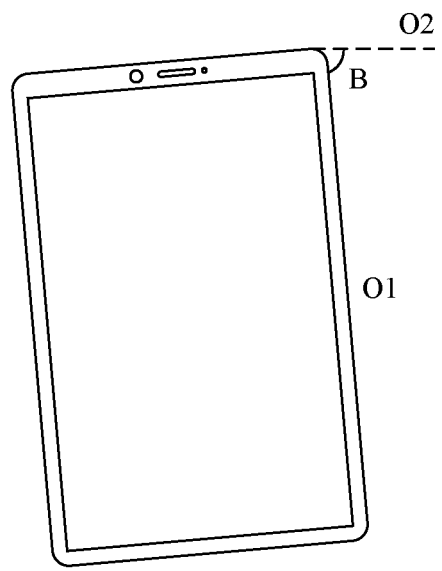

| Electronic device | 100 |
|---|---|
| Processor | 110 |
| External memory interface | 120 |
| Internal memory | 121 |
| USB interface | 130 |
| Charging management module | 140 |
| Power management module | 141 |
| Battery | 142 |
| Antennas | 1 and 2 |
| Mobile communications module | 150 |
| Wireless communications module | 160 |
| Audio module | 170 |
| Speaker | 170A |
| Receiver | 170B |
| Microphone | 170C |
| Headset jack | 170D |
| Sensor module | 180 |
| Gyro sensor | 180A |
| Magnetic sensor | 180B |
| Acceleration sensor | 180C |
| Button | 190 |
| Motor | 191 |
| Indicator | 192 |
| Camera | 193 |
| Display screen | 194 |
| Desktop | 600 |
| Status bar | 601 |
| Dock | 602 |
| Weather icon | 603 |
| Map icon | 604 |
| Settings icon | 605 |
| News icon | 606 |
| News interface | 800 |
| Full-screen button | 801 |

DETAILED DESCRIPTION OF ILLUSTRATIVE EMBODIMENTS

To make the objectives, technical solutions, and advantages of the embodiments of this application clearer, the following clearly and completely describes the technical solutions in the embodiments of this application with reference to the accompanying drawings in the embodiments of this application. It is clear that the described embodiments are some but not all of the embodiments of this application. All other embodiments obtained by a person of ordinary skill in the art based on embodiments of this application without creative efforts shall fall within the protection scope of this application.

"A plurality of" in this application means two or more. In addition, it should be understood that, in descriptions of this application, terms such as "first" and "second" are merely used for distinguishing and description, but should not be understood as indicating or implying relative importance, or should not be understood as indicating or implying a sequence.

When a user uses an electronic device, the electronic device may be in a landscape state or a portrait state. The landscape state is a corresponding state of the electronic device during displaying of the electronic device in landscape mode. The portrait state is a corresponding state of the electronic device during displaying of the electronic device in portrait mode. A display screen of the electronic device may include four sides. The four sides include two parallel long sides having an equal length, which may be referred to as long sides of the display screen. The four sides further include two parallel short sides having an equal length, which may be referred to as short sides of the display screen. In the landscape state, a long side of the display screen of the electronic device is parallel to a horizontal plane (for example, as shown in (a) in FIG. 1), that is, an included angle between the long side of the display screen and the horizontal plane is 0; or an included angle A between a long side 01 of the display screen and a projection 02 of the long side 01 on the horizontal plane is less than or equal to a first preset value (for example, as shown in (b) in FIG. 1), that is, the included angle between the long side of the display screen and the horizontal plane is less than or equal to a first preset value. The first preset value is less than or equal to 45°, and a specific value of the first preset value may be set based on an actual application scenario. For example, the first preset value may be 10° or 20°. In the landscape state, the display screen of the electronic device is basically in a horizontal bar shape.

In the landscape state, a height of the display screen of the electronic device is less than a width of the display screen, and a height-width ratio (that is, a ratio of the height to the width) of the display screen is less than 1. The height of the display screen is a length of a side with a relatively small included angle between the display screen and a vertical plane, and the width of the display screen is a length of a side with a relatively small included angle between the display screen and the horizontal plane. The height of the display screen may also be understood as a longitudinal length of the display screen, the width of the display screen may also be understood as a transverse length of the display screen, and the height-width ratio of the display screen may also be understood as an aspect ratio (that is, a ratio of the longitudinal length to the transverse length) of the display screen.

In the portrait state, a long side of the display screen of the electronic device is perpendicular to the horizontal plane (for example, as shown in (c) in FIG. 1), or an included angle B between a long side 01 of the display screen and a projection 02 of the long side 01 on the horizontal plane is greater than a second preset value (for example, as shown in (d) in FIG. 1, the second preset value is greater than or equal to 45°). In the portrait state, a height of the display screen of the electronic device is greater than a width of the display screen, a height-width ratio of the display screen is greater than 1, and the display screen of the electronic device is basically in a vertical bar shape.

Alternatively, the electronic device in this embodiment of this application may be an electronic device whose display screen is foldable (for example, a foldable-screen mobile phone). When the electronic device whose display screen is foldable is unfolded, the display screen of the electronic device may be divided into a plurality of vertical-bar-shaped display areas. For example, using a location of a folding line as a boundary, the display screen of the electronic device is divided into two display areas. The electronic device whose display screen is foldable may be folded to form at least two screens.

Figure 2:
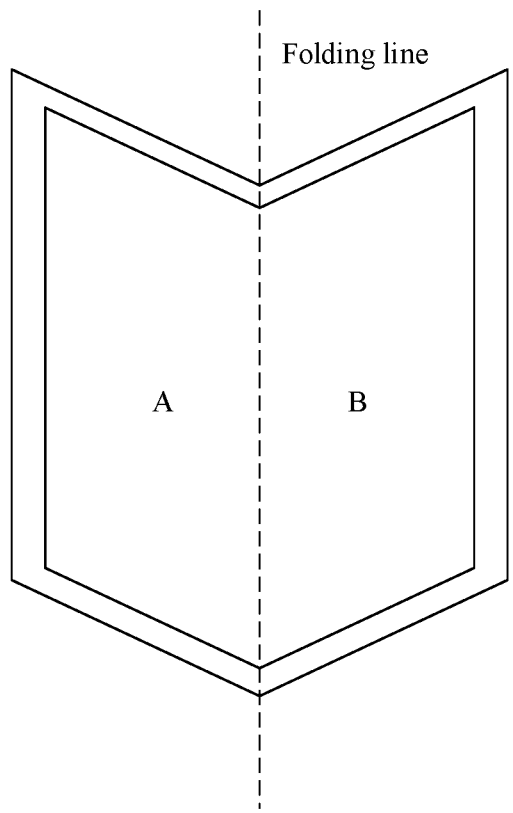
FIG. 2 is a schematic diagram of a form of a foldable screen according to an embodiment of this application.
Figure 2:
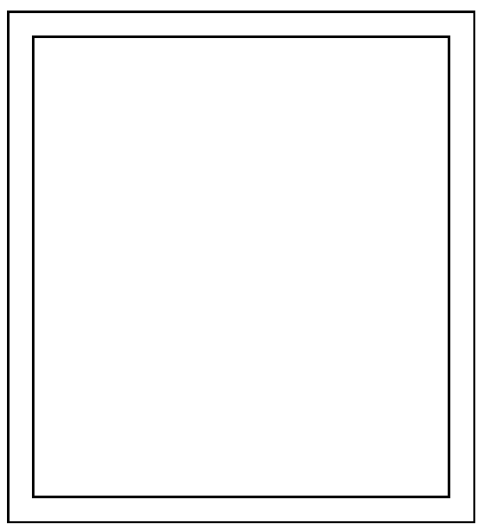
Figure 2:
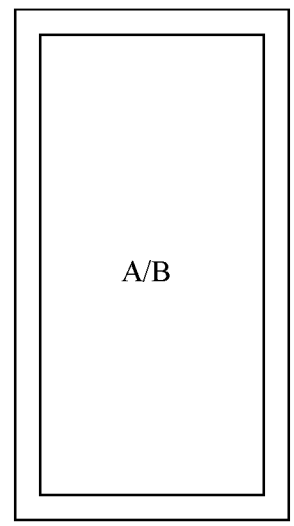

For example, (a), (b), and (c) in FIG. 2 show at least three physical forms that may be included in a display screen of an electronic device whose display screen is foldable: a half-folded form folded at a specific angle, an unfolded form, and a folded form. The display screen of the electronic device whose display screen is foldable is referred to as a foldable screen. As shown in (a) in FIG. 2, the foldable screen of the electronic device whose display screen is foldable may be folded at an angle along a folding line or a folding axis, so that the foldable screen forms a first screen A and a second screen B. The foldable screen may be unfolded outward along the folding line to form the unfolded form of the foldable screen shown in (b) in FIG. 2 when the foldable screen is fully unfolded. The foldable screen may continue to be folded along the folding line to form the foldable screen in a folded state shown in (c) in FIG. 2. After the foldable screen of the electronic device is completely folded, as shown in (c) in FIG. 2, the first screen A and the second screen B are opposite to each other, and the first screen A or the second screen B is visible to the user.

For some electronic devices (for example, foldable-screen mobile phones) whose display screens are foldable, when a foldable screen is in a folded form and the screen of the foldable screen is folded (as shown in (c) in FIG. 2), a difference between a width and a height of the screen is relatively large; or when a display screen of an electronic device is in an unfolded form and the screen of the foldable screen is unfolded (as shown in (b) in FIG. 2), a difference between a width and a height of the screen is relatively small, a width-height ratio of the screen (that is, a ratio of the width to the height of the screen) may be 8:7.1, that is, the screen width-height ratio of the foldable screen in the unfolded form is close to 1:1.

It should be noted that FIG. 2 is merely an example of a foldable-screen electronic device. The electronic device in this embodiment of this application may have a foldable screen that is folded inward, or a foldable screen that is folded outward. Alternatively, the electronic device has a foldable screen of another structure. This is not limited in this embodiment of this application.

Because the height and the width of the display screen of the electronic device are generally different, the electronic device may have the landscape state and the portrait state shown in (a), (b), (c), and (d) in FIG. 1. Correspondingly, a display orientation of the electronic device may include the landscape orientation and the portrait orientation, that is, the screen orientation of the electronic device includes the landscape orientation and the portrait orientation. A width of a display interface of the screen corresponding to the landscape orientation (that is, one side with a relatively small included angle between the display interface and a horizontal direction of the screen) is greater than a height of the display interface (that is, one side with a relatively small included angle between the display interface and a vertical direction of the screen). For example, when a horizontal width displayed by the electronic device is greater than a vertical height, the screen orientation is the landscape orientation. A width of a display interface of the screen corresponding to the portrait orientation (that is, one side with a relatively small included angle between the display interface and the horizontal direction of the screen) is less than a height of the display interface (that is, one side with a relatively small included angle between the display interface and the vertical direction of the screen). For example, when the horizontal width displayed by the electronic device is less than the vertical height, the screen orientation is the portrait orientation.

For example, when the electronic device is in the landscape state, the display orientation of the electronic device is the landscape orientation, and the screen orientation of the electronic device shown in (a) and (b) in FIG. 1 is the landscape orientation.

For example, when the electronic device is in the portrait state, the display orientation of the electronic device is the portrait orientation, and the screen orientation of the electronic device shown in (c) and (d) in FIG. 1 is the portrait orientation.

The electronic device may include a plurality of applications, and may simultaneously run the plurality of applications. One application may include a plurality of application windows. After one application is started, a plurality of application windows may be opened. A window orientation of an application window may include the landscape orientation and the portrait orientation. In a possible implementation, when the window orientation of the application window is the landscape orientation, the application loads a landscape layout. When the window orientation of the application window is the portrait orientation, the application loads a portrait layout. The layout may be used to indicate which icons are arranged in the application window, or used to indicate location information of each icon in the application window, or the like. If the landscape layout is different from the portrait layout, icons or location information of icons in an application interface displayed in the landscape layout may be different from those displayed in the portrait layout.

When the electronic device displays an application interface of an application, if the application has both a landscape layout and a portrait layout, the electronic device selects an appropriate layout based on a current screen orientation. For example, when the electronic device is currently in the landscape state, and the screen orientation of the electronic device is the landscape orientation, the landscape layout of the application is loaded. When the electronic device is currently in the portrait state, and the screen orientation of the electronic device is the portrait orientation, the portrait layout of the application is loaded. In this way, a display layout of the application interface matches the display orientation of the electronic device, that is, the screen orientation of the electronic device, to facilitate viewing by the user.

A window orientation of the application in the electronic device is adaptive to an orientation. If the window orientation of the application is adapted to the portrait orientation, when the electronic device is in the portrait orientation, the electronic device loads portrait display resource information for the application in the current portrait orientation. If the window orientation of the application is adapted to the landscape orientation, when the electronic device is in the landscape orientation, the electronic device loads landscape display resource information for the application in the current landscape orientation. When there is a limited orientation for the window orientation of the application, the electronic device loads a corresponding layout resource only in the limited orientation thereof. For example, if the window orientation of the application indicates that the limited display orientation of the application is the landscape orientation, even if the electronic device is currently placed in the portrait orientation, that is, the screen orientation of the electronic device is the portrait orientation, the electronic device does not load the display resource information of the application in the portrait orientation. To be specific, the electronic device does not load the portrait layout of the application in the portrait orientation, but loads the display resource information in the limited display orientation—the landscape orientation. Currently, most applications are not adapted to the landscape orientation for displaying. When the electronic device is in the landscape orientation, the application interface of the application cannot be displayed in the landscape orientation.

An embodiment of this application provides an application display method. When an electronic device is in a landscape orientation, the electronic device switches an application window to the landscape orientation for displaying, and displays an application interface of an application by using a portrait layout, so that the application not adapted to the landscape orientation loads the portrait layout of the application window in the landscape orientation, thereby improving user experience.

In this embodiment of this application, a width and a height of the application window keep consistent with a width and a height of a screen of the electronic device in the landscape orientation. This ensures that the application interface can be displayed in full screen in the landscape orientation. For example, in a landscape state, if the width of the screen of the electronic device is 163 cm and the height of the screen of the electronic device is 146 cm, the width and height of the screen in the landscape orientation are 163 cm and 146 cm. In this case, the width of the application window is set to 163 cm, and the height of the application window is set to 146 cm. In the landscape state, if the width of the screen of the electronic device is 146 cm and the height of the screen of the electronic device is 163 cm, the application window is displayed in full screen in a portrait state. In this case, the width of the application window is 146 cm, and the height of the application window is 163 cm.

In this embodiment of this application, a difference between the width and the height of the screen of the electronic device is less than or equal to a preset value. To be specific, a width-height ratio of the screen (that is, a ratio of the width to the height of the screen) is close to 1:1, and the difference between the width and the height of the screen is not large. For example, the width of the screen of the electronic device is 146 cm, the height of the screen is 163 cm, and the screen is close to a square. In this case, there is no great difference between a display effect of the electronic device in the landscape state and that in the portrait state. Therefore, the electronic device displays the application interface in full screen by using the portrait layout in the landscape state, and loads the portrait layout of the application window. In terms of user experience, an effect of displaying the application interface in full screen by using the portrait layout in the landscape state by the electronic device is consistent with an effect of displaying the application interface in full screen by loading the landscape layout in the landscape state. The preset value may be set based on experience. This is not specifically limited in this application.

The display method provided in this embodiment of this application may be applied to an electronic device such as a tablet, a mobile phone (for example, a foldable-screen mobile phone), a notebook computer, a television, or a smart screen. A specific type of the electronic device is not limited in this embodiment of this application. It may be understood that, to achieve a better display effect, the display method provided in this embodiment of this application is applicable to an electronic device whose screen width-height ratio is close to 1:1, such as a mobile phone, a PAD, or a television.

Figure 3A:
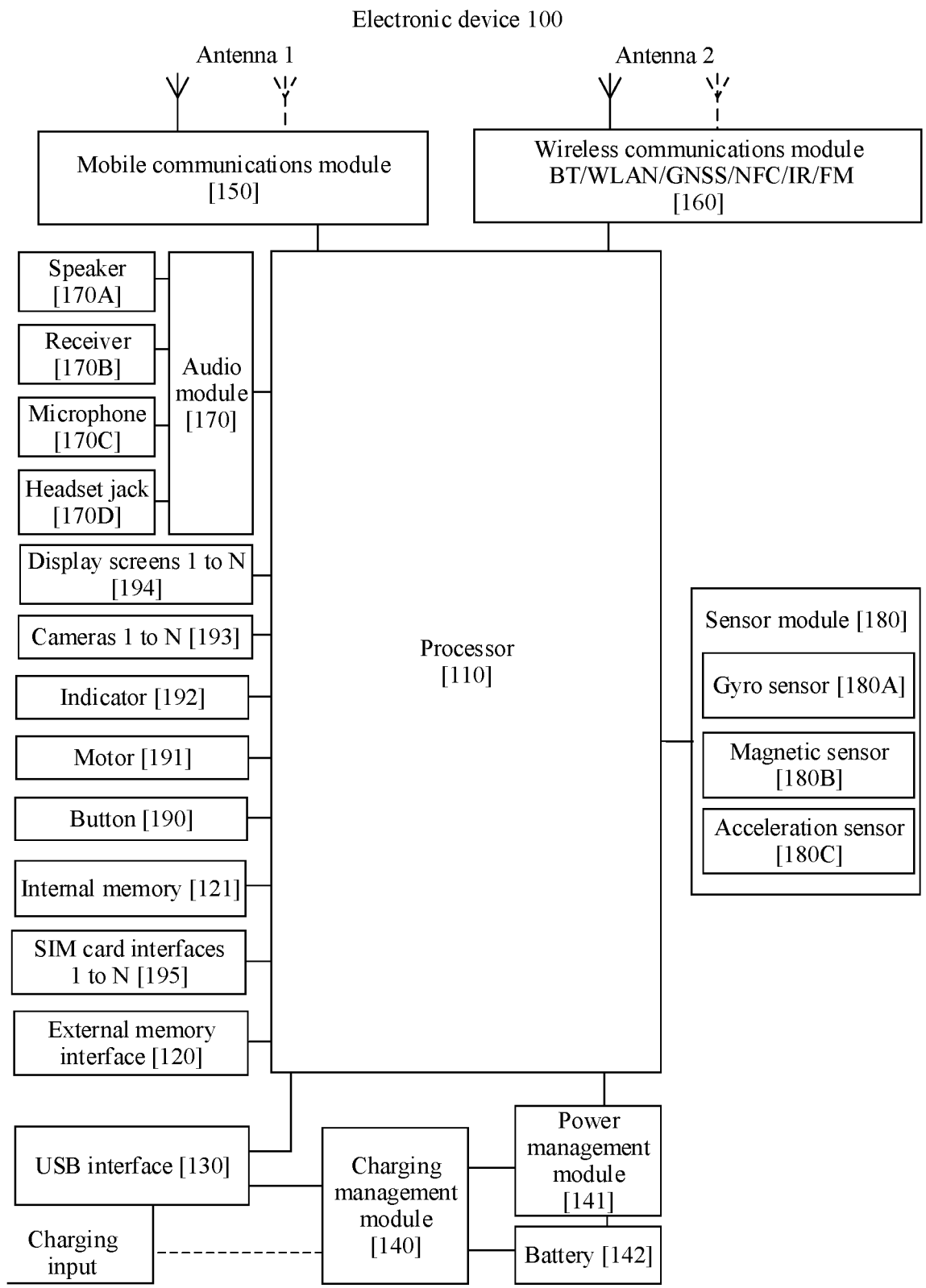
FIG. 3A is a schematic diagram of a hardware structure of an electronic device according to an embodiment of this application.

For example, FIG. 3A is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (subscriber identification module, SIM) card interface 195, and the like. The sensor module 180 may include a gyro sensor 180A, a magnetic sensor 180B, an acceleration sensor 180C, and the like.

It may be understood that the structure shown in this embodiment of this application does not constitute a specific limitation on the electronic device 100. In some other embodiments of this application, the electronic device 100 may include more or fewer components than those shown in the figure, some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache. The memory may store an instruction or data just used or cyclically used by the processor 110. If the processor 110 needs to use the instruction or the data again, the processor may directly invoke the instruction or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The USB interface 130 is an interface complying with a USB standard specification, and may be specifically a mini USB interface, a micro USB interface, a USB t e-C interface, or the like. The USB interface 130 may be configured to connect to a charger to charge the electronic device 100, or may be configured to transmit data between the electronic device 100 and a peripheral device, or may be configured to connect to a headset for playing an audio through the headset. The interface may be further configured to connect to another electronic device such as an AR device.

It may be understood that an interface connection relationship between the modules shown in this embodiment of this application is merely an example for description, and does not constitute a limitation on the structure of the electronic device 100. In some other embodiments of this application, the electronic device 100 may alternatively use an interface connection mode different from that in the foregoing embodiment, or use a combination of a plurality of interface connection modes.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. When charging the battery 142, the charging management module 140 may further supply power to the electronic device by using the power management module 141.

The power management module 141 is configured to connect to the battery 142, the charging management module 140, and the processor 110. The power management module 141 receives an input of the battery 142 and/or the charging management module 140, and supplies power to the processor 110, the internal memory 121, the display screen 194, the camera 193, the wireless communications module 160, and the like. The power management module 141 may be further configured to monitor a parameter such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communications function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be reused to improve antenna utilization. For example, the antenna 1 may be reused as a diversity antenna of a wireless local area network. In some other embodiments, an antenna may be used in combination with a tuning switch.

The mobile communications module 150 may provide a solution applied to the electronic device 100 and incorporating wireless communication such as 2G/3G/4G/5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert, by using the antenna 1, the signal into an electromagnetic wave for radiation. In some embodiments, at least some functional modules in the mobile communications module 150 may be disposed in the processor 110. In some embodiments, at least some functional modules of the mobile communications module 150 and at least some modules of the processor 110 may be disposed in a same component. The modem processor may include a modulator and a demodulator. In some embodiments, the modem processor may be an independent component. In some other embodiments, the modem processor may be independent of the processor 110, and is disposed in a same component as the mobile communications module 150 or another functional module.

The wireless communications module 160 may provide a solution applied to the electronic device 100 and incorporating wireless communication such as a wireless local area network (wireless local area network, WLAN) (for example, a Wireless Fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, and an infrared (infrared, IR) technology. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the to-be-sent signal, and convert, by using the antenna 2, the signal into an electromagnetic wave for radiation.

In some embodiments, the antenna 1 of the electronic device 100 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, the GNSS, the WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric computation, and render an image. The processor 110 may include one or more GPUs, and the GPUs execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device 100 may include one or N display screens 194, where N is a positive integer greater than 1.

The electronic device 100 may implement a photographing function by using the ISP, the camera 193, the video codec, the GPU, the display screen 194, the application processor, and the like.

The ISP is configured to process data fed back by the camera 193. For example, during shooting, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a still image or a video. An optical image of an object is generated through a lens and projected to the photosensitive element. The photosensitive element may be a charge-coupled device (charge coupled device, CCD) or a complementary metal oxide semiconductor (complementary metal-oxide-semiconductor, CMOS) optoelectronic transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal, and may process another digital signal in addition to a digital image signal. For example, when the electronic device 100 selects a frequency, the digital signal processor is configured to perform Fourier transform on frequency energy.

The video codec is configured to compress or decompress a digital video. The electronic device 100 may support one or more video codecs. Therefore, the electronic device 100 may play or record videos in a plurality of coding formats, for example, moving picture experts group (moving picture experts group, MPEG)1, MPEG2, MPEG3, and MPEG4.

The internal memory 121 may include one or more random access memories (random access memory, RAM) and one or more non-volatile memories (non-volatile memory, NVM). The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth generation DDR SDRAM, generally referred to as a DDR5 SDRAM), or the like. The non-volatile memory may include a magnetic disk storage device or a flash memory (flash memory). Classified based on an operating principle, the flash memory may include a NOR flash, a NAND flash, a 3D NAND flash, or the like. Classified based on levels of cells, the flash memory may include a single-level cell (single-level cell, SLC), a multi-level cell (multi-level cell, MLC), a triple-level cell (triple-level cell, TLC), a quad-level cell (quad-level cell, QLC), or the like. Classified based on storage specifications, the flash memory may include a universal flash memory (English: universal flash storage, UFS), an embedded multimedia card (embedded multimedia card, eMMC), or the like.

The random access memory may be directly read and written by the processor 110. The random access memory may be configured to store an operating system or an executable program (for example, a machine instruction) of another running program, and may be further configured to store data of a user and an application, or the like.

The non-volatile memory may also store the executable program, and store the data of the user and the application, or the like, and may load the foregoing to the random access memory in advance, so that the processor 110 directly performs reading and writing.

The external memory interface 120 may be configured to connect to an external non-volatile memory, to extend a storage capacity of the electronic device 100. The external non-volatile memory communicates with the processor 110 by using the external memory interface 120, to implement a data storage function. For example, files such as music and a video are stored in the external non-volatile memory.

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for outputting, and is also configured to convert an analog audio input into a digital audio signal. The audio module 170 may be further configured to encode and decode audio signals. In some embodiments, the audio module 170 may be disposed in the processor no, or some functional modules of the audio module 170 are disposed in the processor 110.

The speaker 170A, also referred to as a "loudspeaker", is configured to convert an electrical audio signal into a sound signal. The electronic device 100 may be configured to listen to music or answer a hands-free call by using the speaker 170A.

The receiver 170B, also referred to as an "earpiece", is configured to convert an electrical audio signal into a sound signal. When a call is answered or speech information is received by using the electronic device 100, the receiver 170B may be put close to a human ear to listen to a speech.

The microphone 170C, also referred to as a "mike" or a "microphone", is configured to convert a sound signal into an electrical signal. When making a call or sending speech information, the user may make a sound near the microphone 170C by using the mouth of the user, to input a sound signal to the microphone 170C. At least one microphone 170C may be disposed in the electronic device 100. In some other embodiments, two microphones 170C may be disposed in the electronic device 100, to collect sound signals and further implement a noise reduction function. In some other embodiments, three, four, or more microphones 170C may alternatively be disposed in the electronic device 100, to collect sound signals, implement noise reduction, and identify a sound source, to implement a directional recording function or the like.

The headset jack 170D is configured to connect to a wired headset. The headset jack 170D may be the USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The gyro sensor 180A may be configured to determine a motion status of the electronic device 100. In some embodiments, angular velocities of the electronic device 100 around three axes (that is, an x-axis, a y-axis, and a z-axis) may be determined by using the gyro sensor 180A. The gyro sensor 180A may be configured to implement image stabilization during photographing. For example, when the shutter is pressed, the gyro sensor 180A detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyro sensor 180A may be further used in a navigation scenario and a motion-sensing game scenario.

The magnetic sensor 180B includes a Hall effect sensor. The electronic device 100 may detect opening and closing of a flip cover by using the magnetic sensor 180B. In some embodiments, when the electronic device 100 is a flip phone or a foldable-screen mobile phone, the electronic device 100 may detect opening and closing of the flip cover by using the magnetic sensor 180B. Further, a feature such as automatic unlocking upon opening of the flip cover is set based on a detected opening or closing state of the flip cover.

The acceleration sensor 180C may detect accelerations in various directions (usually on three axes) of the electronic device 100, and may detect a magnitude and a direction of gravity when the electronic device 100 is stationary. The acceleration sensor 180C may be further configured to identify a status of the electronic device, and is used in an application such as switching between landscape and portrait or a pedometer.

The electronic device 100 may determine, by using one or more of the acceleration sensor 180C, the gyro sensor 180A, the gravity sensor, or the like, whether the electronic device is currently in a landscape state or a portrait state.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different areas of the display screen 194. Different application scenarios (for example, a time reminder, information receiving, an alarm clock, and a game) may also correspond to different vibration feedback effects. The touch vibration feedback effects may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The electronic device 100 interacts with a network by using the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In an embodiment of this application, an Android system with a layered architecture is used as an example to describe the software structure of the electronic device 100.

Figure 3B:
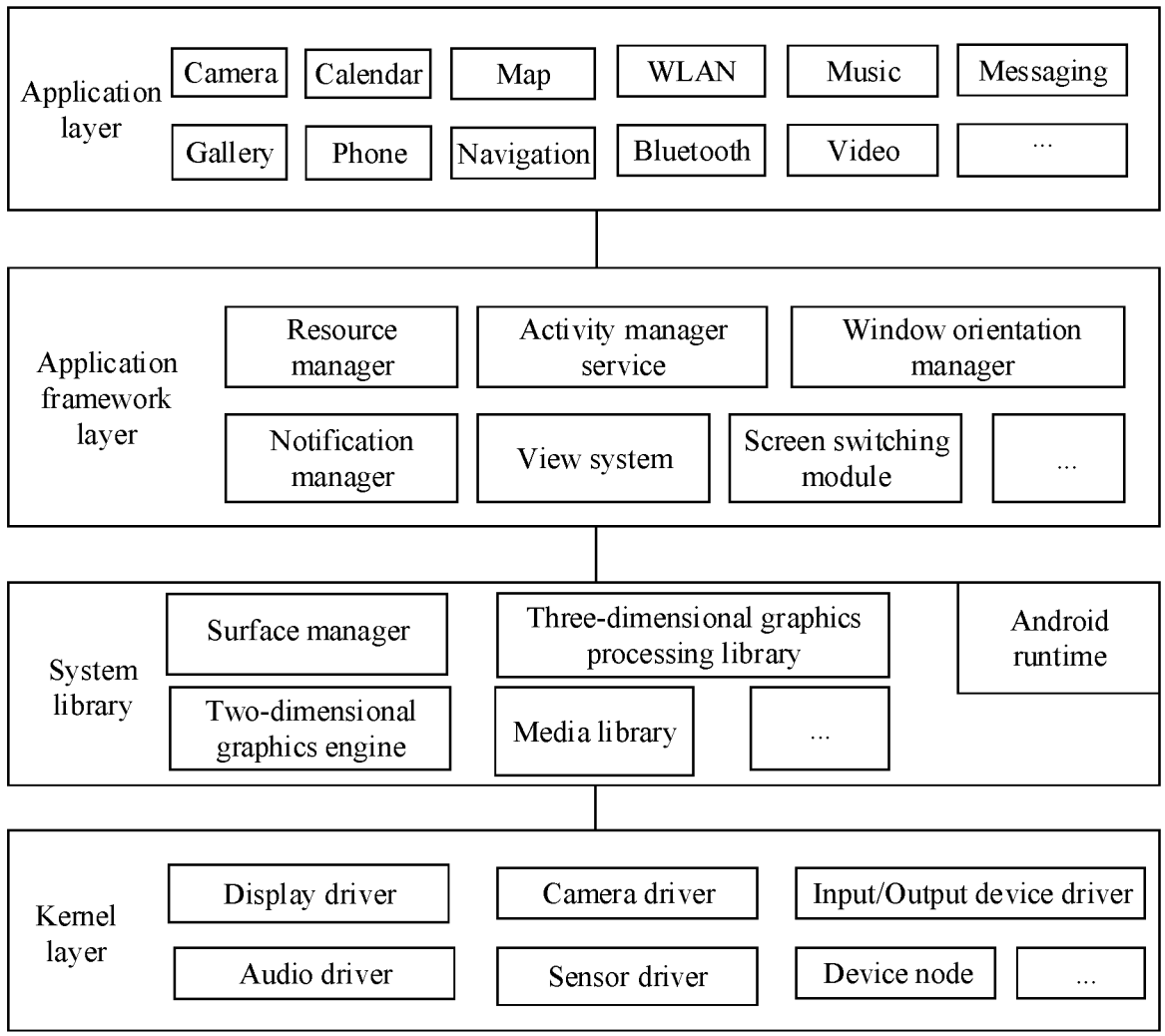
FIG. 3B is a schematic diagram of a software structure of an electronic device according to an embodiment of this application.

FIG. 3B is a block diagram of the software structure of the electronic device 100 according to this embodiment of this application.

In the layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 3B, the application packages may include applications such as Camera, Gallery, Calendar, Phone, Map, Navigation, WLAN, Bluetooth, Music, Video, and Messaging.

The application framework layer provides an application programming interface (application programming interface, API) and a programming framework for the applications at the application layer. The application framework layer includes some predefined functions.

As shown in FIG. 3B, the application framework layer may include a resource manager, an activity manager service, a window orientation manager, a screen switching module, a notification manager, a view system, and the like.

The resource manager provides various resources such as a localized character string, an icon, a picture, a layout file, and a video file for an application. The resource manager stores related data of the application and an application window at runtime, for example, window information such as an orientation, a size, a width, and a height of the application window, and system information such as a system language, and a system orientation, where the data further includes information such as pixel density. The application and the application window obtain corresponding information from the resource management module to complete actions such as a display layout of the application window.

The activity manager service (activity manager service, AMS) is configured to manage an activity and is responsible for end-to-end management of application activity components, such as activity start management, lifecycle management, display size management, and visibility management.

The activity is an application component, and may provide an interface, so that the user interacts with the electronic device by using the interface, to complete a task, for example, dialing a number, taking a photo, sending an email, or viewing a map. Each activity is assigned a window, that is, an application window, on which a user interface can be drawn. The application window is usually in full screen, but it can also be smaller than the screen and float above other application windows. One application usually includes a plurality of activities. Usually, in an application, there is a main activity, equivalent to an entry to the application. Other activities are started from this main activity.

The window orientation manager is responsible for managing a window orientation of an application, that is, configured to manage a display orientation of an application window. The window orientation manager provides an interface for the screen switching module, so that the screen switching module invokes the window orientation of the application window to further determine a viewing direction of the user.

The screen switching module is configured to manage a system screen switching function, a screen switching effect, and the like. The screen switching module listens to data of a sensor in the system. The screen switching module obtains the orientation of the application window from the window orientation management module, determines an orientation in which the application window should be displayed, determines whether to rotate the application window, and the like.

It may be understood that sensors may be further classified into hardware-based sensors and software-based sensors. A hardware-based sensor is usually implemented by a physical component. The hardware-based sensor usually obtains data by measuring an attribute of a special environment, for example, a gravity acceleration, geomagnetic field strength, or an azimuth change. A software-based sensor does not depend on a physical device. Although the software-based sensor simulates a hardware-based sensor, the software-based sensor usually obtains data by using one or more hardware sensors, and sometimes invokes a virtual sensor, an artificial sensor, or the like. A linear acceleration sensor and a gravity sensor are software-based sensors.

Specifically, a location of the electronic device may be determined by using two sensors: a geomagnetic field sensor (the geomagnetic field sensor) and an orientation sensor (the orientation sensor). The orientation sensor is based on software, and data of the orientation sensor is obtained by using the acceleration sensor 180C and the magnetic sensor 180B together.

The view system includes visual controls such as a control for displaying a text and a control for displaying a picture. The view system may be configured to construct an application. A display interface may include one or more views. For example, a display interface including an SMS message notification icon may include a text display view and a picture display view.

The notification manager enables the application to display notification information in a status bar, and may be configured to convey a notification message. The notification manager may automatically disappear after a short pause without requiring user interaction. For example, the notification manager is configured to notify download completion or provide a message notification. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an alert sound is played, the electronic device 100 vibrates, or the indicator light blinks.

The Android runtime includes a kernel library and a virtual machine. The Android runtime is responsible for scheduling and management of the Android system.

The kernel library includes two parts: a function that needs to be invoked in a Java language and a kernel library of Android.

The application layer and the application framework layer are run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, still image files, and the like. The media library may support a plurality of audio and video coding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer may include a display driver, an input/output device driver (for example, a driver for a keyboard, a touchscreen, a headset, a speaker, or a microphone), a device node, a camera driver, an audio driver, a sensor driver, and the like. The user performs an input operation by using an input device. The kernel layer may generate a corresponding original input event based on the input operation, and store the original input event in the device node.

It should be emphasized that FIG. 3B shows merely an example. The software structure of the electronic device 100 provided in this embodiment of this application may alternatively use another software architecture, for example, a software architecture of iOS®, Harmony®, Windows®, Linux, or another operating system.

A display solution provided in this embodiment of this application may be implemented based on a system of the electronic device. Based on a lower layer modification of the system, a screen orientation of the electronic device is switched from a portrait orientation to a landscape orientation, an application window of an application is switched to the landscape orientation for displaying, and a window orientation in display resource information of the application is changed to the portrait orientation, so that an application interface of the application is still laid out and displayed based on an original portrait layout. Further, a width and a height of the application window keep consistent with a width and a height of the window in the landscape state of the electronic device, so that the application loads a portrait layout of the application window in the landscape orientation of the electronic device. This ensures that the application can be displayed in full screen in the landscape orientation of the electronic device. In this way, a full-screen display effect is achieved, and user experience is improved.

Figure 4A:
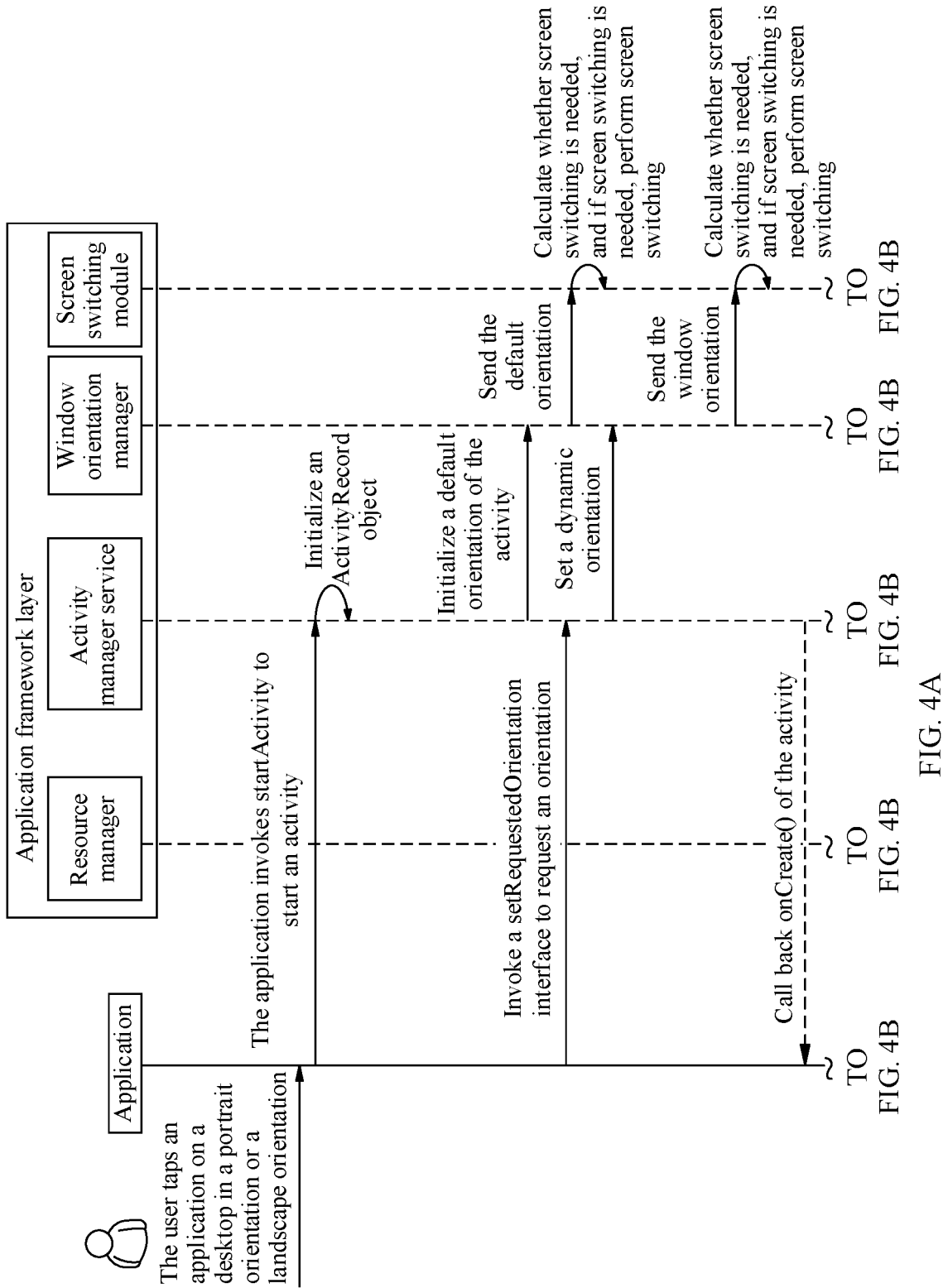

For a display procedure provided in this embodiment of this application based on the foregoing software modules, refer to FIG. 4A and FIG. 4B. The screen orientation of the electronic device may be the portrait orientation or the landscape orientation. The user starts an application on the electronic device. The application on the electronic device may be a native application or a third-party application. This is not limited in this embodiment of this application. Specifically, the input/output device driver may detect an input event of the user, for example, an input event of tapping an icon of an application by the user on the desktop, or an input event of opening an interface by using a voice instruction of the user. The input/output device driver reports the input event of the user to an input event management server (not shown in the figure) at the application framework layer. The input event management server may be configured to perform processing such as translation and encapsulation on the original input event to obtain an input event including more information, and send the input event to a window management server. The window management server stores a tappable area (for example, a control) of each application, location information of a focus window, and the like. Therefore, the window management server can correctly distribute the input event to a specified control or focus window. The input event management server distributes the input event to the corresponding application. The application invokes a startActivity interface in the activity manager service to start an activity corresponding to the input event, that is, start a corresponding application window.

When the activity manager service starts the application window, the activity manager service first creates an ActivityRecord object, and the ActivityRecord object is used to manage an activity application window. The activity manager service obtains a configuration file of the application. The window orientation manager loads data from the configuration file, and initializes a default orientation of the activity, that is, initializes a default orientation of the application window. The window orientation manager sends the default orientation of the application window to the screen switching module through an interface. The screen switching module listens to a sensor. When a physical form of the electronic device changes, data of the sensor changes, and the sensor may determine a current physical form of the electronic device. The screen switching module calculates whether screen switching is needed, that is, determines, based on information such as the default orientation of the application window, an orientation status of the electronic device that is detected by the sensor, and orientation locking on a notification bar, an orientation in which the application window is to be displayed. For example, if the default orientation of the application window is the portrait orientation, and the current screen orientation of the electronic device is the portrait orientation, screen switching is not needed. If the default orientation of the application window is the landscape orientation, and the current screen orientation of the electronic device is the portrait orientation, screen switching is needed.

An activity of the application may invoke a system interface setRequestedOrientation at any time to dynamically set a window orientation of the activity of the application. As shown in FIG. 4A and FIG. 4B, for example, a dynamic orientation of the application window is invoked once during starting of the application. The application invokes a system interface setRequestedOrientation to request the dynamic orientation, to request the dynamic orientation from the activity manager service. The activity manager service sets the requested dynamic orientation for the window orientation manager. The window orientation manager determines the window orientation of the current application window, and sends the determined window orientation to the screen switching module through an interface. The screen switching module calculates whether screen switching is needed, that is, determines, based on information such as the current window orientation, the orientation status of the electronic device that is detected by the sensor, and orientation locking on the notification bar, the orientation in which the application window is to be displayed.

In this embodiment of this application, the window orientation manager is responsible for managing the orientation of the application window, including the default orientation and dynamic orientation of the application window. The default orientation is the default orientation configured in a configuration file of the activity. The value is a permanently fixed value and cannot be dynamically changed. As shown in FIG. 4A and FIG. 4B, the default orientation of the activity is initialized. The dynamic orientation is an orientation that can be dynamically requested by invoking a system application programming interface (Application Programming Interface, API) during running of the activity, and the requested orientation is the dynamic orientation. For example, if the orientation configured in the configuration file of the application is the portrait orientation and the orientation dynamically requested during running of the activity is the landscape orientation, the default orientation is the portrait orientation and the dynamic orientation is the landscape orientation.

In this embodiment of this application, unless otherwise specified, the orientation of the application window is a window orientation of the application window managed by the window orientation manager. The window orientation manager may determine the window orientation of the application window with reference to the default orientation and the dynamic orientation.

For example, the orientation of the application window may be primarily the dynamic orientation preferentially. If the dynamic orientation is not requested, the orientation of the application window is determined based on the default orientation. To be specific, if the dynamic orientation of the application window is requested, the orientation of the application window is the dynamic orientation; or if the dynamic orientation is not requested, the orientation of the application window is the default orientation.

For example, a default orientation of an application window A of the activity is the portrait orientation. During running of the activity, the activity invokes an API to dynamically request an orientation. In this case, the requested dynamic orientation is the landscape orientation, and the window orientation manager determines that a window orientation of the application window is the landscape orientation. In a possible implementation, the system switches the application window to the landscape orientation for displaying.

For example, a default orientation of an application window B of the activity is the landscape orientation. During running of the activity, the activity invokes an API to dynamically request an orientation. In this case, the requested dynamic orientation is the portrait orientation, and the window orientation manager determines that a window orientation of the application window is the portrait orientation. In a possible implementation, the system switches the application window to the portrait orientation for displaying.

For example, a default orientation of an application window C of the activity is the portrait orientation. During running of the activity, the activity does not dynamically request an orientation. In this case, the window orientation manager determines that a window orientation of the application window is the portrait orientation, and the application window is displayed in the portrait orientation.

For example, a default orientation of an application window D of the activity is the landscape orientation. During running of the activity, the activity does not dynamically request an orientation. In this case, the window orientation manager determines that a window orientation of the application window is the landscape orientation, and the activity is displayed in the landscape orientation.

For example, a default orientation of an application window E of the activity is a sensor orientation, during running of the activity, the activity does not dynamically request an orientation. In an example, after collecting sensor data, a sensor (for example, the acceleration sensor) at a hardware layer may send the sensor data to the application framework layer through the kernel layer. The application framework layer determines the current physical form of the electronic device based on the sensor data, and further determines the window orientation of the application window based on the current physical form of the electronic device.

The application window of the activity follows the sensor for displaying. To be specific, the sensor detects data that the electronic device is in the portrait state, the screen switching module detects the data monitored by the sensor, and the screen switching module determines that the electronic device is in the portrait state, and that the screen orientation of the electronic device is the portrait orientation. In this case, the orientation of the application window is the portrait orientation. The sensor detects data that the electronic device is in the landscape state, the screen switching module detects the data monitored by the sensor, and the screen switching module determines that the electronic device is in the landscape state, and that the screen orientation of the electronic device is the landscape orientation. In this case, the orientation of the application window is the landscape orientation. In other words, the window orientation of this activity is an adaptive orientation. Specifically, when the window orientation of the application window is set to the sensor orientation, with respect to the window orientation of the application window, the physical form of the electronic device is perceived by using the sensor of the electronic device, and then the window orientation of the application window is determined based on the physical form of the electronic device.

When the window orientation of the application window is the sensor orientation, the layout of the application window is determined by the sensor. For example, a SCREEN ORIENTATION SENSOR parameter may be used to set the screen orientation of the electronic device to follow the sensor, and the screen orientation may be affected to 0°, 90°, 180°, or 270°. In this case, the window orientation of the application window may be the screen orientation. If the screen orientation is the landscape orientation, the window orientation is the landscape orientation, and the screen switching module switches the application window to the landscape orientation for displaying. If the screen orientation is the portrait orientation, the window orientation is the portrait orientation, and the screen switching module switches the application window to the portrait orientation for displaying.

As shown in FIG. 4A and FIG. 4B, the activity manager service calls back onCreate( ) of the activity for the application, and an onCreate event indicates that the activity is being created. When the activity is created, onCreate( ) is invoked. Generally, the activity is initialized in the onCreate( ) method. An example of initialization work is: setting layout work, loading data, and binding controls. The activity manager service may further call back onResume( ) of the activity for the application. An onResume event indicates that the activity is visible. The visible activity is transferred from the background to the foreground and can interact with the user.

It may be understood that the system may further call back lifecycle methods such as onRestart, onStart, onResume, onPause, onStop, and onDestroy for the application. This is not specifically limited in this application.

As shown in FIG. 4A and FIG. 4B, the activity manager service may call back onConfigurationChanged( ) for the resource manager for a plurality of times to refresh display resource information of the application window. Information in the display resource information includes information such as a language, a font, density (pixel density), an actual window size and coordinates, a window orientation, and a screen size.

As shown in FIG. 4A and FIG. 4B, the activity manager service calls back onCreate( ) of the activity for the application. The activity manager service may call back onConfigurationChanged( ) for the resource manager to update the display resource information. The resource manager may call back onConfigurationChanged( ) to provide updated display resource information for the application. The application invokes a corresponding interface to obtain the updated display resource information from the resource manager.

As shown in FIG. 4A and FIG. 4B, the activity manager service calls back onResume( ) of the activity for the application. The activity manager service may call back onConfigurationChanged( ) to provide updated display resource information for the resource manager. The resource manager may call back onConfigurationChanged( ) to provide the updated display resource information for the application. The application invokes a corresponding interface to obtain the updated display resource information from the resource manager.

The system calls back onCreate( ) and onResume( ) of the activity, and other key callbacks for the application. In these callbacks, the application invokes an interface of the resource management module to obtain information such as the window size, orientation, and pixel density to calculate, display, and refresh the layout of the application interface.

It may be understood that an onConfigurationChanged event is frequently updated. For an attribute update in the activity manager service and the orientation manager by the system, the system sends the attribute update to the resource manager module by using the onConfigurationChanged event, and correspondingly, the resource manager also notifies the application. For example, when the information in the display resource information is changed, the activity manager may call back onConfigurationChanged( ) for the application, so that the application calls back onConfigurationChanged( ) for the resource manager, and the resource manager obtains updated information, including information such as the language, font, density (pixel density), actual window size and coordinates, window orientation, and screen size.

The following description is provided by using an example in which an electronic device is a foldable screen, and a physical form of the foldable screen is an unfolded form. A technical solution provided in an embodiment of this application is described in detail by using an example in which the foldable screen displays an application in a portrait orientation.

Figure 5:
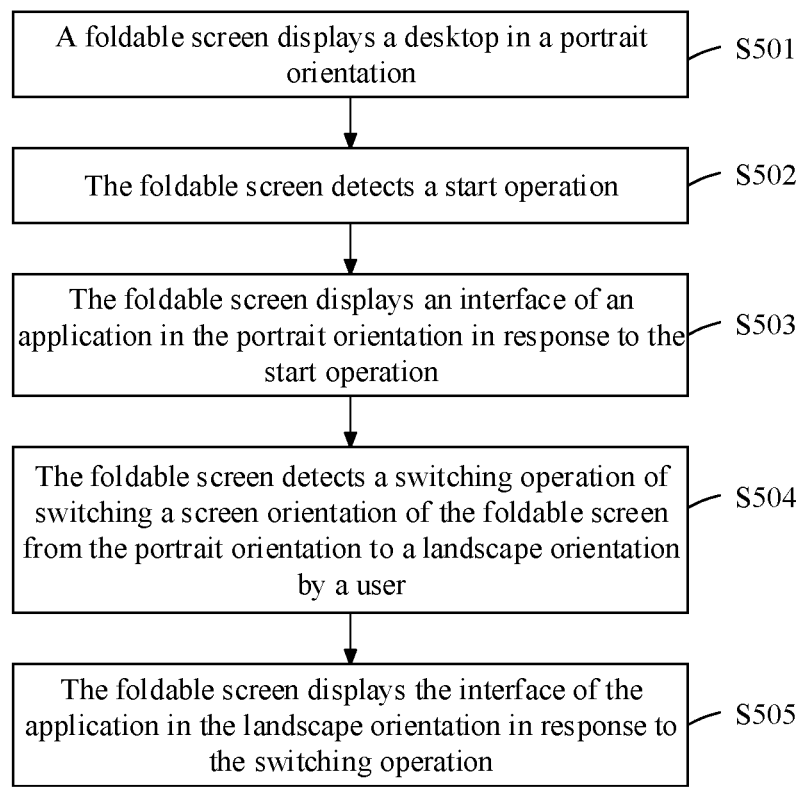
FIG. 5 is a schematic flowchart of another application display method according to an embodiment of this application.

As shown in FIG. 5, an application display method provided in an embodiment of this application may include the following steps. Based on different requirements, a sequence of steps in the application display method may be changed, and some steps may be omitted.

Step S501: A foldable screen displays a desktop in a portrait orientation.

In this embodiment of this application, the foldable screen may display the desktop in the portrait orientation, or may display the desktop in a landscape orientation. That the foldable screen is in the portrait orientation means that a screen orientation of the foldable screen is the portrait orientation. That the foldable screen is in the landscape orientation means that the screen orientation of the foldable screen is the landscape orientation.

In a possible implementation, when the foldable screen is in a portrait state, a transverse length of a display screen of the foldable screen is less than a longitudinal length of the display screen, the foldable screen is in a vertical bar shape, and a screen orientation of the foldable screen is a sensor orientation. In this case, the screen orientation of the foldable screen is the portrait orientation. When the foldable screen is in a landscape state, a transverse length of the display screen of the foldable screen is greater than a longitudinal length of the display screen, the foldable screen is in a horizontal bar shape, and a screen orientation of the foldable screen is a sensor orientation. In this case, the screen orientation of the foldable screen is the landscape orientation.

It may be understood that when the foldable screen is in the landscape orientation, the foldable screen is not necessarily in the landscape state. Correspondingly, when the foldable screen is in the portrait orientation, the foldable screen is not necessarily in the portrait state. For example, the screen orientation of the foldable screen is the landscape orientation, but the foldable screen rests on the ground.

Figure 6:
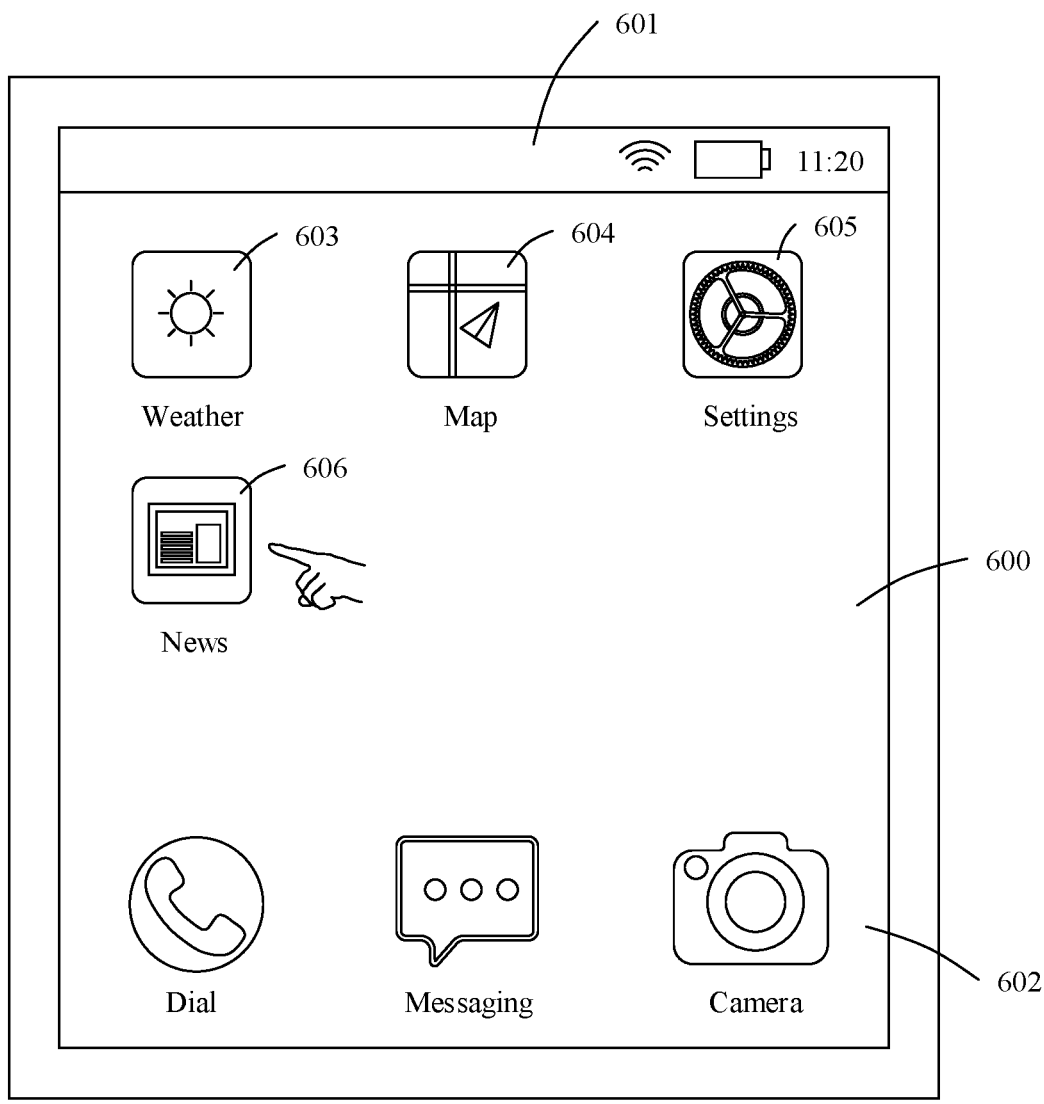
FIG. 6 is a schematic interface diagram of an electronic device according to an embodiment of this application.

As shown in FIG. 6, the foldable screen may display a desktop 600 in the portrait orientation. The desktop 600 may include a status bar 601 and a dock 602. The dock 602 further includes icons of a plurality of applications, such as a weather icon 603, a map icon 604, a settings icon 605, and a News icon 606. The status bar 601 may include time, signal strength (for example, a Wi-Fi icon), current remaining power, and the like. In addition, it may be understood that in some other embodiments, the status bar 601 may further include a Bluetooth icon, an alarm clock icon, an external device icon, and the like. The dock 602 may include icons of commonly used applications (application, App), for example, a dialing icon, a messaging icon, and a camera icon.

Step S502: The foldable screen detects a start operation.

The start operation may be an operation of indicating to start an application by a user. The start operation may be a user gesture operation on the desktop, or may be a user voice operation. The gesture operation may be a touch gesture operation or a floating gesture operation. The touch gesture operation may be a tapping operation, a double-tapping operation, a pressing and holding operation, a heavy pressing operation (to be specific, pressing with great force), or the like.

As shown in FIG. 6, the start operation may be an operation of tapping the News icon 606 on the desktop by the user.

Step S503: The foldable screen displays an interface of the application in the portrait orientation in response to the start operation.

The user taps the News icon 606, and an input/output device drives an input event of tapping the News icon on the desktop by the user. Refer to the application display method in FIG. 4A and FIG. 4B to start an activity of the news application, and display an interface of the news application in the portrait state.

Step S504: The foldable screen detects a switching operation of switching the screen orientation of the foldable screen from the portrait orientation to the landscape orientation by the user.

For example, the user inputs the switching operation on the foldable screen to trigger switching of the screen orientation of the foldable screen from the portrait orientation to the landscape orientation, and the foldable screen detects the switching operation input by the user. The switching operation includes but is not limited to the following manner: The user taps a corresponding control to trigger switching of the screen orientation of the foldable screen from the portrait orientation to the landscape orientation. The control includes but is not limited to a full-screen button or a rotation button. Alternatively, the user taps an auto-rotation button to enable a screen auto-rotation function of the foldable screen, and rotates the foldable screen, for example, to switch the foldable screen from the portrait state to the landscape state. Rotating the screen orientation of the foldable screen means using the screen auto-rotation function (for example, a G-sensor, gravity sensor) of the foldable screen to perceive a swing direction of the foldable screen when the user uses the foldable screen, and then rotating the screen orientation based on the swing direction of the foldable screen, to switch the screen orientation from the portrait orientation to the landscape orientation.

Figure 8A:
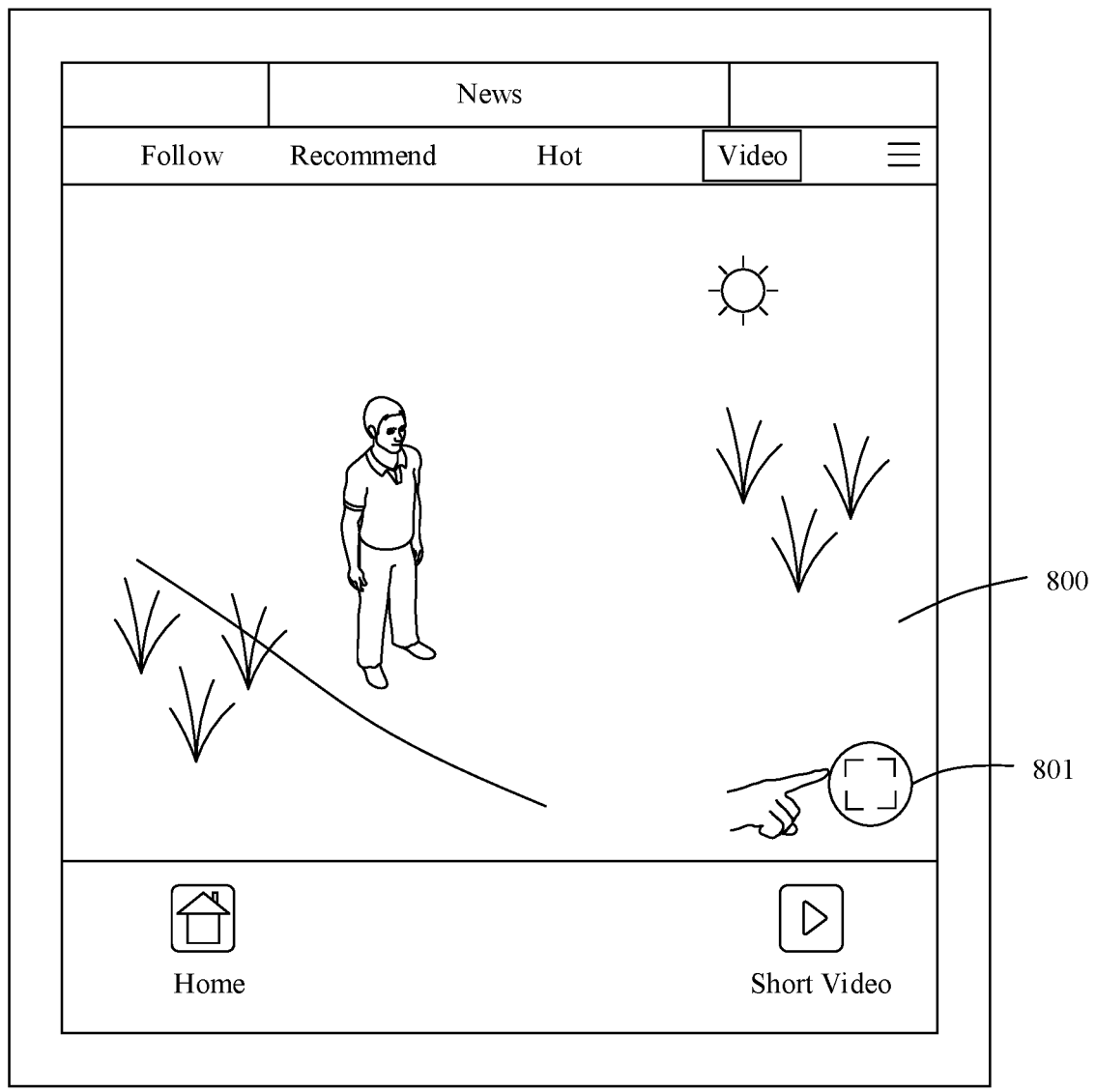
FIG. 8*a* is another interface diagram of an electronic device according to an embodiment of this application.

After the user taps the News icon 606 on the desktop, the interface of the news application is displayed. For example, the user may further tap a video icon on an interface of a home page of the news application to enter a corresponding video interface. For example, a News interface 800 shown in FIG. 8a is a video interface of the news application. The News interface 800 further includes a full-screen button 801. When the user taps the full-screen button 801, the user inputs, to an electronic device, a switching operation of switching the screen orientation of the electronic device from the portrait orientation to the landscape orientation.

Figure 8B:
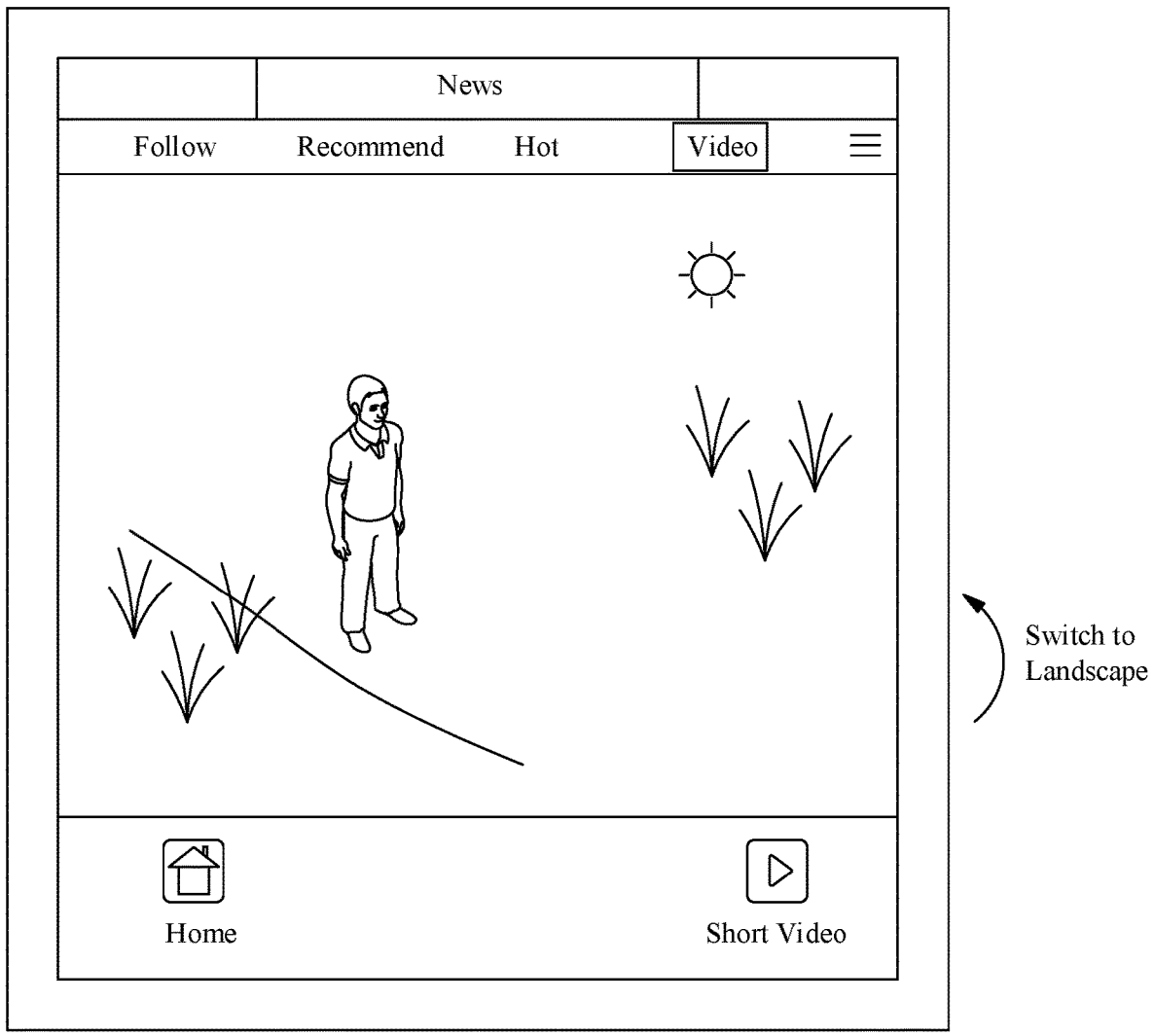
FIG. 8*b* is another interface diagram of an electronic device according to an embodiment of this application.

In a possible implementation, after a window orientation of an application window is set to the sensor orientation, or the user taps the auto-rotation button to enable the screen auto-rotation function of the foldable screen, as shown in FIG. 8b, the user switches the electronic device from the portrait state to the landscape state, and the user inputs, to the electronic device, a switching operation of switching the screen orientation of the electronic device from the portrait orientation to the landscape orientation.

Step S505: The foldable screen displays the interface of the application in the landscape orientation in response to the switching operation.

Figure 7:
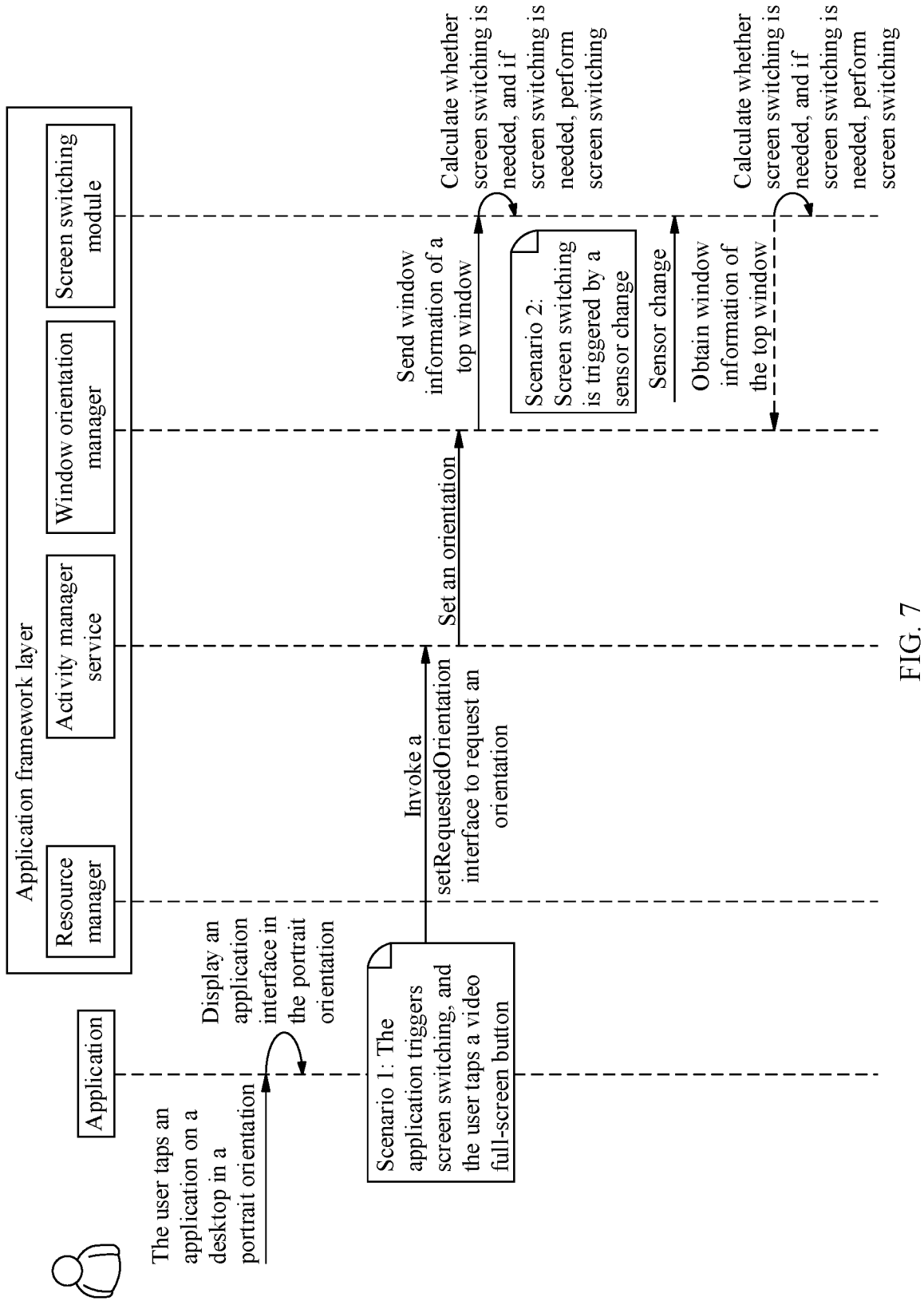
FIG. 7 is a schematic flowchart for triggering screen switching according to an embodiment of this application.

Specifically, two scenarios are used to describe triggering of screen orientation switching, including triggering by the application by invoking an interface and triggering by a sensor data change. As shown in FIG. 7, when the electronic device is in the portrait orientation, the user taps the application icon on the desktop to start the application, the application is started in the portrait orientation, and the application interface of the application is displayed in the portrait orientation.

In a scenario 1, the application triggers switching of the screen orientation. When the user taps the video full-screen button, the application invokes a setRequestedOrienation( ) interface to request an orientation. The application invokes the interface to request the landscape orientation from an activity manager service. The activity manager invokes a window orientation manager to save a dynamic orientation requested by the application. The activity manager service sets the requested dynamic orientation for the window orientation manager, and the window orientation manager saves a window orientation of a top window of the application as the landscape orientation. The window orientation manager invokes an interface to send the window orientation of the top window to a screen switching module, to trigger the screen switching module to calculate whether screen switching needs to be triggered. If screen switching needs to be triggered, the screen switching is performed, the application window is switched from the portrait orientation to the landscape orientation, and the application interface in the landscape orientation is displayed.

In a scenario 2, the window orientation of the application is set to the sensor orientation. The user rotates the electronic device from the portrait state to the landscape state. The sensor detects that data changes, and the screen switching module detects that the sensor data changes and determines that a current physical form of the electronic device is the landscape state. In this case, the window orientation manager sets the window orientation of the application window to the landscape orientation, and the screen switching module invokes an interface to learn, from the orientation manager, that the window orientation of the top window of the application window is the landscape orientation, to trigger the screen switching module to calculate whether screen switching needs to be triggered. If screen switching needs to be triggered, the screen switching is performed, the application window is switched from the portrait orientation to the landscape orientation, and the application interface is displayed in the landscape orientation.

When the foldable screen displays the interface of the application in the landscape orientation in response to the switching operation of switching the screen orientation from the portrait orientation to the landscape orientation by the user, because some applications are not adapted to the landscape orientation and have no dedicated landscape layout, the applications cannot be normally displayed in the landscape orientation, and a problem of disorder of an application interface layout may exist.

Figure 8C:
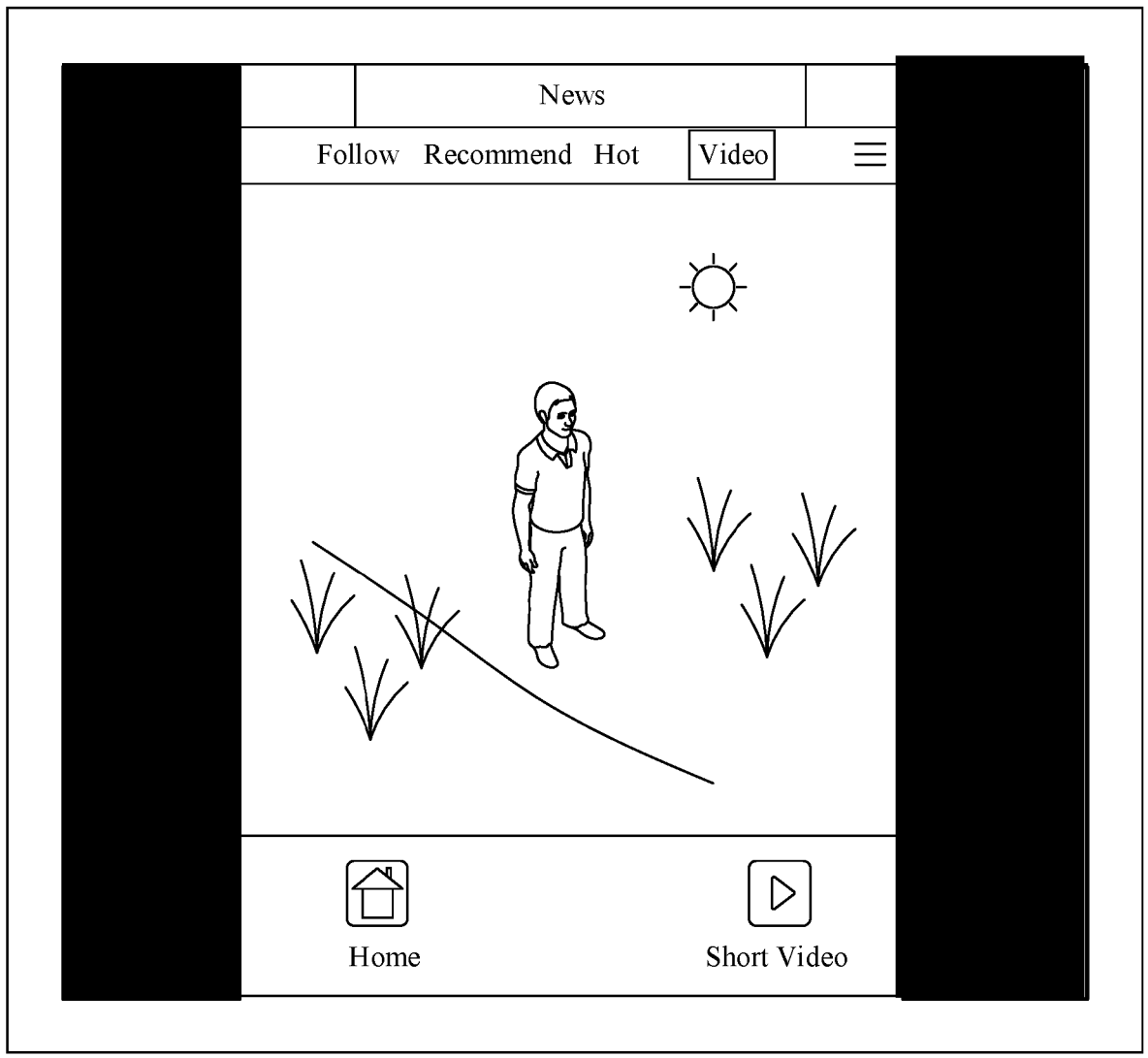
FIG. 8*c* is another interface diagram of an electronic device according to an embodiment of this application.

As shown in FIG. 8c, after the screen orientation of the foldable screen is switched from the portrait orientation to the landscape orientation, because the application is not adapted to the landscape orientation, for example, the application is not adapted to a width and a height in the landscape orientation, when the application is displayed in the landscape orientation, the application window is scaled in proportion to the width and the height in the landscape orientation, the width of the application window is reset, and a black edge or blank processing is displayed on either side of the application interface.

Figure 8D:
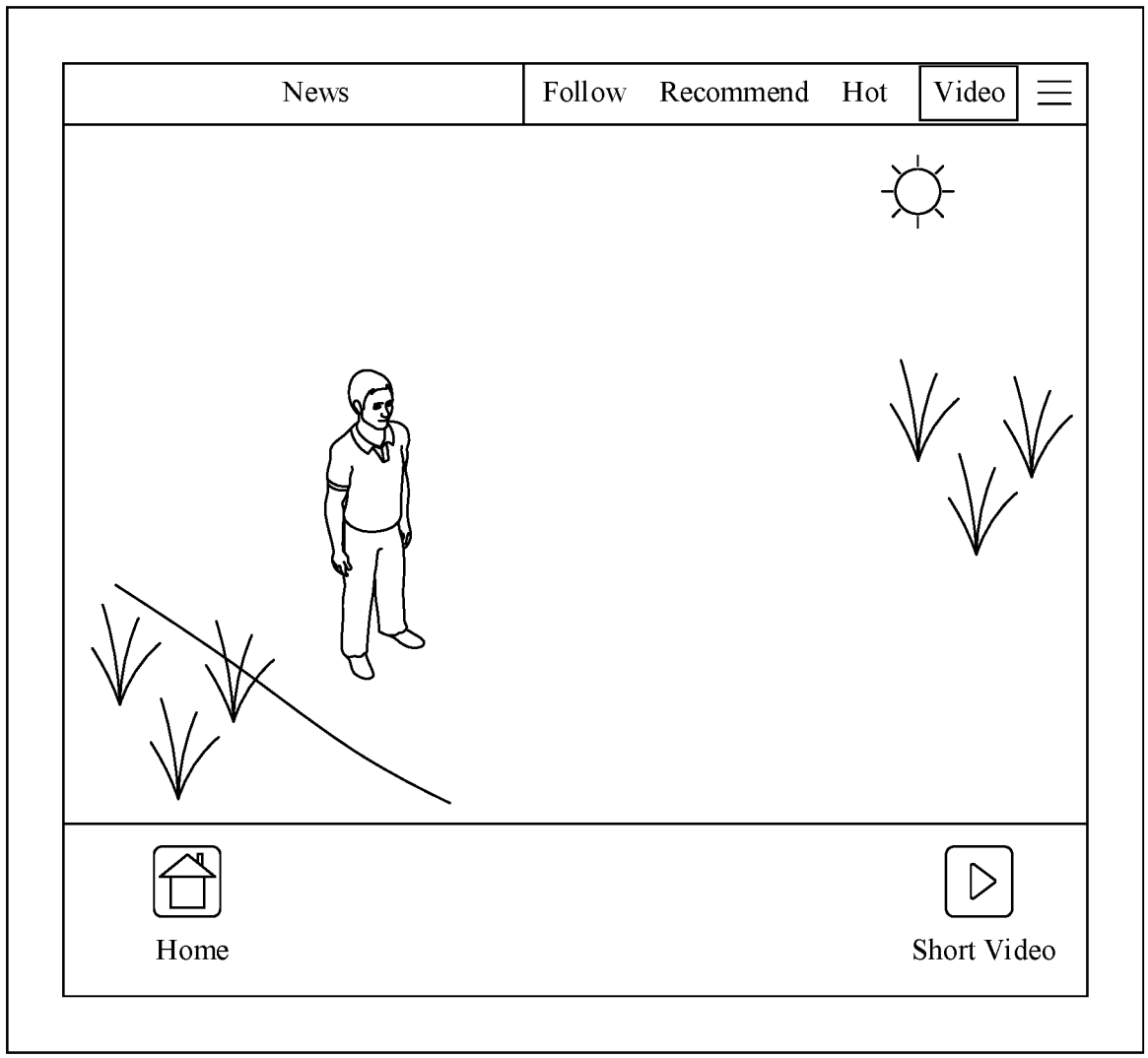
FIG. 8*d* is another interface diagram of an electronic device according to an embodiment of this application.

As shown in FIG. 8d, some applications are adapted based on a screen size and support the landscape orientation and the portrait orientation, and display layouts and proportions thereof are adjusted in the landscape orientation. However, layouts of these applications are adjusted and modified by developers based on the device screen size. The modification workload is heavy, and each application needs to be modified and adapted.

Figure 8E:
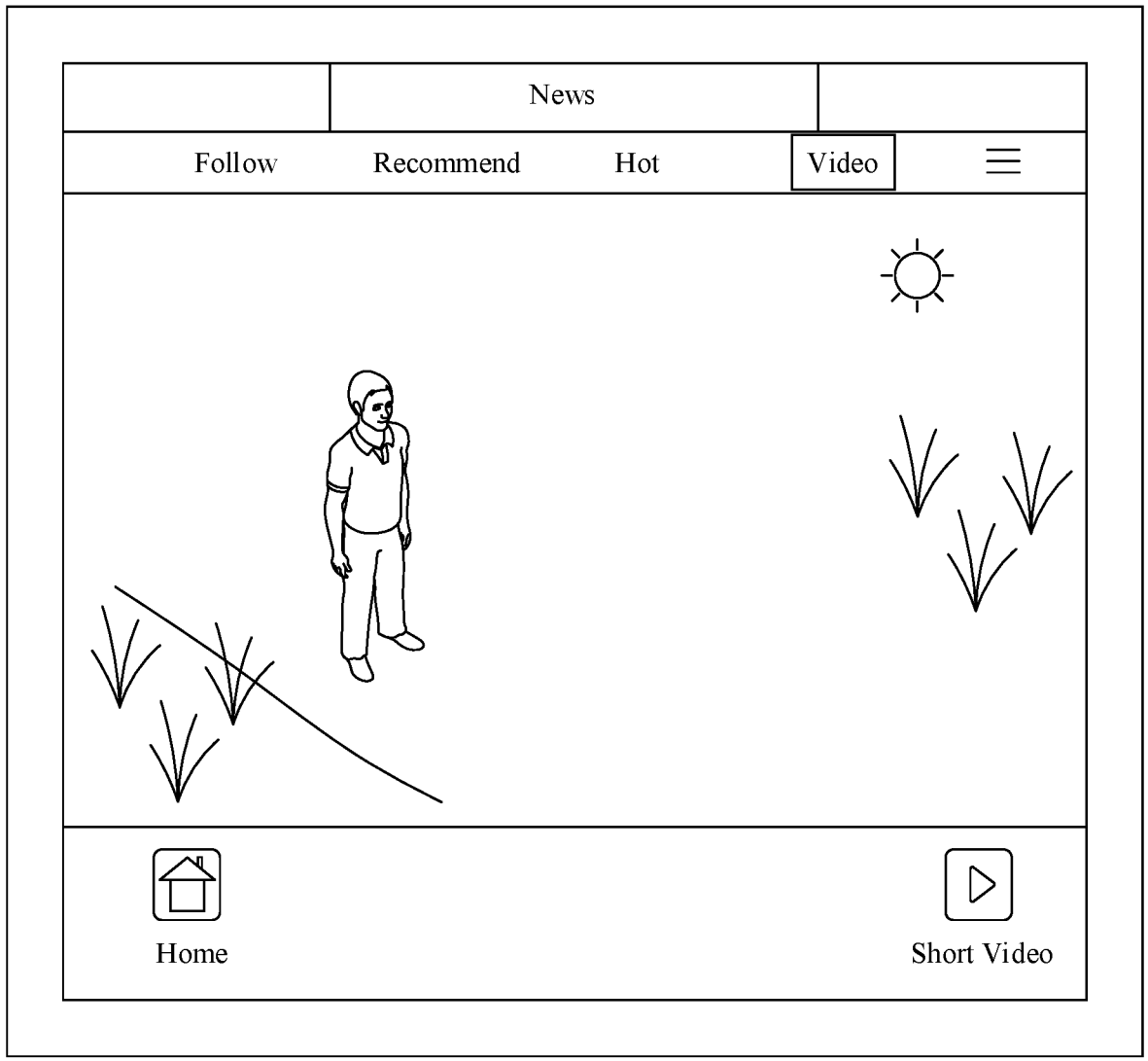
FIG. 8*e* is another interface diagram of an electronic device according to an embodiment of this application.

As shown in FIG. 8e, after the screen orientation of the foldable screen is switched from the portrait orientation to the landscape orientation, according to the application display method in this application, there is no need to modify the application, and a window orientation in application window display resource information is set to the portrait orientation, so that the application is still laid out and displayed based on the portrait layout. In addition, the application window is switched to the landscape orientation for displaying. Further, a width and a height of the application window are set based on the width and height of the foldable screen in the landscape orientation, so that the application interface can be displayed in full screen in the landscape orientation of the foldable screen, thereby achieving a full-screen display effect of the portrait layout in the landscape orientation.

Figure 9:
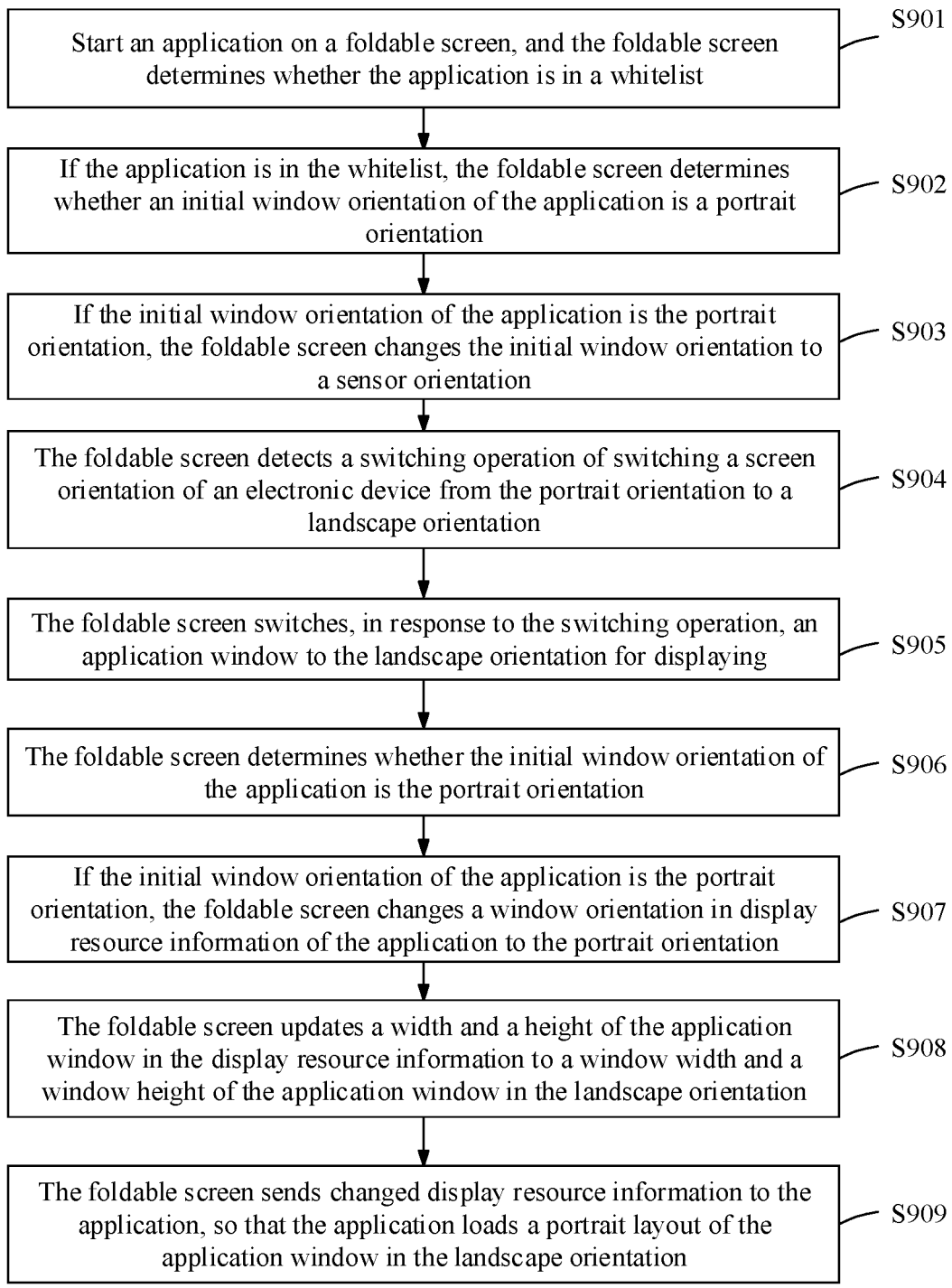
FIG. 9 is a schematic flowchart of another application display method according to an embodiment of this application.

FIG. 9 is a schematic flowchart of an application display method according to an embodiment of this application. The application display method is applied to an electronic device, and described by using an example in which the electronic device is a foldable screen and a physical form of the foldable screen is an unfolded form. A sequence of steps in the application display method may be changed, and some steps may be omitted.

Step S901: Start an application on the foldable screen, and the foldable screen determines whether the application is in a whitelist.

In this embodiment of this application, a user taps an icon of the application on the foldable screen to start the application corresponding to the icon, and the foldable screen determines whether the started application is in the whitelist.

The whitelist may be set by a vendor. The vendor tests displaying of applications, determines, through the test, applications to which the application display method provided in this embodiment of this application is applicable, and adds applications that pass the test to the whitelist.

In a possible implementation, the whitelist may be set by the user, and the user selects to add an application to the whitelist, so that the application can be displayed by using the application display method provided in this embodiment of this application.

Step S902: If the application is in the whitelist, the foldable screen determines whether an initial window orientation of the application is a portrait orientation.

In this embodiment of this application, if the foldable screen determines that the application is not in the whitelist, the application display method provided in this embodiment of this application is not applicable to displaying of the application.

In this embodiment of this application, if the foldable screen determines that the started application is in the whitelist, the foldable screen determines whether the initial window orientation of the application is the portrait orientation. A purpose of determining the initial window orientation of the application is to determine whether an application window of the application supports a landscape orientation. It may be understood that the application may have a plurality of application windows and that an initial window orientation of the application window includes but is not limited to the portrait orientation, the landscape orientation, and a sensor orientation. When the initial window orientation of the application window is the landscape orientation or the sensor orientation, the application window supports displaying in the landscape orientation, and the application window is not processed according to this application.

The initial window orientation may be understood as an unchanged window orientation of the application window after the application is started, that is, the initial window orientation is an orientation existing before the window orientation is changed.

For example, after the application is started, a window orientation manager obtains the whitelist from a system configuration, and determines that the application is in the whitelist. As shown in FIG. 4A and FIG. 4B, the window orientation manager obtains a default orientation of the application from an activity manager service, where the default orientation is the initial window orientation, and the window orientation manager determines whether the default orientation is the portrait orientation.

For example, after the application is started, the application requests a dynamic orientation. As shown in FIG. 4A and FIG. 4B, the application invokes a setRequestedOrientation interface to request the dynamic orientation from the activity manager service. The activity manager service sets the dynamic orientation for the window orientation manager, and the window orientation manager obtains the dynamic orientation. In this case, the dynamic orientation is the initial window orientation, and the window orientation manager determines whether the dynamic orientation is the portrait orientation.

In this embodiment of this application, the initial window orientation may be the default orientation or the dynamic orientation, but needs to be a window orientation existing before the orientation is changed by using the application display method in this application.

In a possible implementation, the initial window orientation may be obtained when a switching operation is detected. For example, if the application has not requested a dynamic orientation when the application is started during the switching operation, the initial window orientation is the default orientation. If the application has requested a plurality of dynamic orientations, the initial window orientation is a last requested orientation among the requested plurality of dynamic orientations.

Step S903: If the initial window orientation of the application window is the portrait orientation, the foldable screen changes the initial window orientation to the sensor orientation.

In this embodiment of this application, if it is determined that the initial window orientation of the application window is not the portrait orientation, for example, the initial window orientation of the application window is the landscape orientation or the sensor orientation, the window of the application supports displaying in the landscape orientation, the system returns the landscape orientation to the application window, and the application loads a landscape layout, that is, the application is displayed in the landscape orientation in a redesigned landscape layout, and the application window is not processed according to this application.

In this embodiment of this application, if the foldable screen determines that the initial window orientation of the application is the portrait orientation, the foldable screen temporarily considers that the application window does not support the landscape orientation. In this case, the foldable screen changes the initial window orientation to the sensor orientation.

Step S904: The foldable screen detects a switching operation of switching a screen orientation of the electronic device from the portrait orientation to the landscape orientation.

In this embodiment of this application, the switching operation may be performed by the user, for example, may be triggered by the application or may be triggered by a sensor change. This is not specifically limited in this application.

In this embodiment of this application, step S901 to step S904 may not be strictly performed sequentially. In a possible implementation, the foldable screen may perform the following steps. Step S901: Start an application on the foldable screen, and the foldable screen determines whether the application is in a whitelist. Step S902: If the application is in the whitelist, the foldable screen detects a switching operation of switching a screen orientation of the electronic device from a portrait orientation to a landscape orientation. Step S903: The foldable screen determines whether an initial window orientation of the application is the portrait orientation. Step S904: If the initial window orientation of the application is the portrait orientation, the foldable screen changes the initial window orientation to a sensor orientation.

Step S905: The foldable screen switches, in response to the switching operation, the application window to the landscape orientation for displaying.

In this embodiment of this application, after the initial window orientation of the application is changed to the sensor orientation, displaying of the application window changes with the sensor. For example, when the user inputs a switching operation of switching the screen orientation of the electronic device from the portrait orientation to the landscape orientation, the foldable screen switches, in response to the switching operation, the application window to the landscape orientation for displaying, for example, changes a width and a height of the application window to a width and a height in the landscape orientation.

In this embodiment of this application, for an application not adapted to the landscape orientation, even if the user inputs a switching operation of switching the screen orientation of the electronic device from the portrait orientation to the landscape orientation, an application window of the application is not switched to the landscape orientation for displaying. Therefore, in this application, the initial window orientation of the application is changed to the sensor orientation, so that displaying of the application window may change with the sensor. When the user switches the screen orientation of the electronic device from the portrait orientation to the landscape orientation, the electronic device may switch the application window to the landscape orientation for displaying.

In this embodiment of this application, when the application window is switched to the landscape orientation for displaying, the application window may be properly stretched. In the unfolded form of the foldable screen, a width-height ratio (that is, a ratio of a width to a height of the screen) of the screen is close to 1:1, and a stretching effect of the application window is not obvious.

Step S906: The foldable screen determines whether the initial window orientation of the application is the portrait orientation.

In this embodiment of this application, an application window whose initial window orientation is the portrait orientation is processed according to the solution of this application, but an application window whose initial window orientation is the landscape orientation is not processed. Therefore, before a window orientation in display resource information of the application in the foldable screen is changed to the portrait orientation, it is necessary to determine whether the initial window orientation of the application is the portrait orientation, to avoid an incorrect change.

In this embodiment of this application, the foldable screen switches, in response to the switching operation of switching the screen orientation of the electronic device from the portrait orientation to the landscape orientation by the user, the application window to the landscape orientation for displaying, and the application may be triggered to request a dynamic orientation. Therefore, it is necessary to determine whether the window orientation of the application is the portrait orientation. If the application requests the dynamic orientation and the application requests the landscape orientation, the procedure ends, and the application window is displayed in the landscape orientation in the landscape layout. If the application does not request the landscape orientation, the procedure continues.

Step S907: If the initial window orientation of the application is the portrait orientation, the foldable screen changes the window orientation in the display resource information of the application to the portrait orientation.

In this embodiment of this application, the foldable screen responds to the switching operation of switching the screen orientation of the electronic device from the portrait orientation to the landscape orientation. If the application does not request the landscape orientation, the application window of the application does not support displaying in the landscape orientation, that is, the application window of the application is not adapted to the landscape orientation. After step S905 of switching the application window to the landscape orientation for displaying is performed, the window orientation in the display resource information of the application is the landscape orientation. On a basis that the application window of the application is not adapted to the landscape orientation, the foldable screen changes the window orientation in the display resource information of the application from the landscape orientation to the portrait orientation, so that the application not adapted to the landscape orientation can load a portrait layout in the portrait orientation to which the application is adapted, and refresh the application interface.

Step S908: The foldable screen updates the width and the height of the application window in the display resource information to the window width and the window height of the application window in the landscape orientation.

In this embodiment of this application, after step S905, the foldable screen updates the width and the height of the application window in the display resource information to the window width and the window height of the application window in the landscape orientation. To be specific, the width of the application window is updated from the window width in the portrait orientation to the window width in the landscape orientation, and the height of the application window is updated from the window height in the portrait orientation to the window height in the landscape orientation, so that the application window can be displayed in full screen in the landscape orientation.

In a possible implementation, the application window may not be displayed in full screen. This is not specifically limited in this application.

Step S909: The foldable screen sends changed display resource information to the application, so that the application loads the portrait layout of the application window in the landscape orientation.

In this embodiment of this application, the width and the height of the application window in the changed display resource information are respectively the window width and the window height of the application window in the landscape orientation, and the window orientation of the application window is the portrait orientation. In this embodiment, the changed display resource information may further include pixel density, a language, and the like.

In this embodiment of this application, the foldable screen sends the changed display resource information to the application, and the application refreshes application interface content in the application window in the landscape orientation based on the portrait layout.

Figure 10:
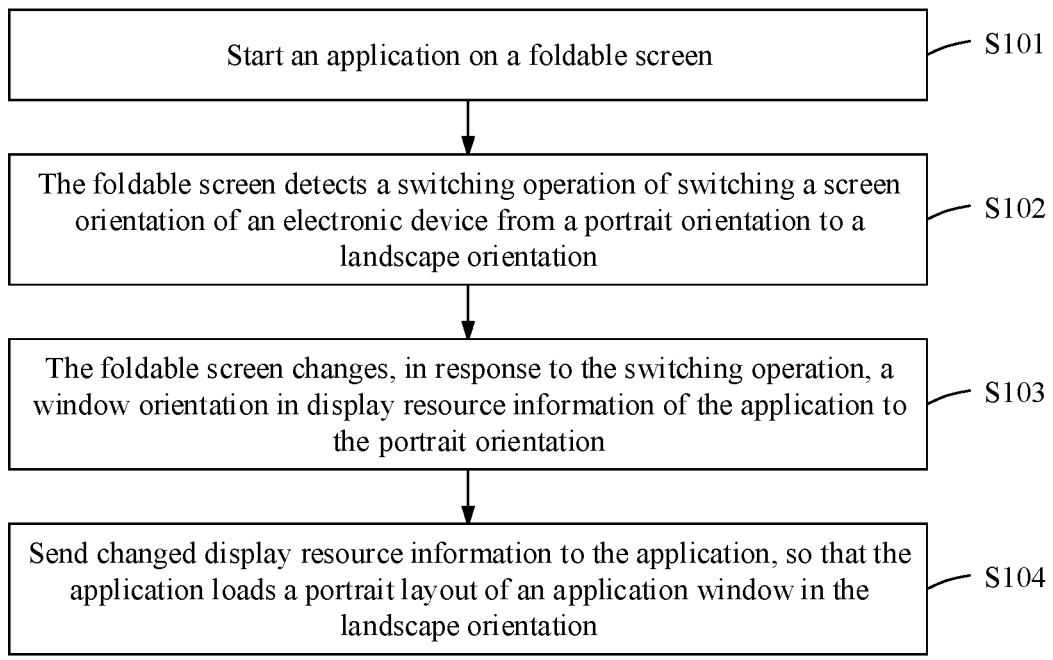
FIG. 10 is a schematic flowchart of another application display method according to an embodiment of this application.

In a possible implementation, as shown in FIG. 10, a foldable screen may perform the following steps.

Step S101: Start an application on the foldable screen.

Step S102: The foldable screen detects a switching operation of switching a screen orientation of an electronic device from a portrait orientation to a landscape orientation.

Step S103: The foldable screen changes, in response to the switching operation, a window orientation in display resource information of the application to the portrait orientation.

In this embodiment of this application, in response to the switching operation, the foldable screen determines whether an initial window orientation of the application is the portrait orientation, and if the initial window orientation of the application is the portrait orientation, switches an application window of the application to the landscape orientation for displaying.

In this embodiment of this application, before responding to the switching operation, the foldable screen determines whether the initial window orientation of the application is the portrait orientation, and if the initial window orientation of the application is the portrait orientation, changes the initial window orientation to a sensor orientation, so that the application window of the application is controlled to follow the screen orientation for displaying.

In a possible implementation, the initial window orientation may be first changed to the sensor orientation, so that the application window of the application is controlled to follow the screen orientation for displaying; and then the window orientation in the display resource information of the application is changed to the portrait orientation, so that the application loads a portrait layout of the application window in the landscape orientation. Alternatively, the window orientation in the display resource information of the application may be first updated to the portrait orientation to ensure that the window orientation in the display resource information is the portrait orientation, and then the application loads a portrait layout. Then the initial window orientation is changed to the sensor orientation, so that the application window of the application is controlled to follow the screen orientation for displaying and that the application loads a portrait layout of the application window in the landscape orientation. Alternatively, the initial window orientation is changed to the sensor orientation, so that the application window of the application is controlled to follow the screen orientation for displaying; and the window orientation in the display resource information of the application is changed to the portrait orientation, so that the application loads a portrait layout of the application window in the landscape orientation. This is not specifically limited in this application.

Step S104: Send changed display resource information to the application, so that the application loads the portrait layout of the application window in the landscape orientation.

In this embodiment of this application, the window orientation in the display resource information of the application is changed to the portrait orientation. The application receives the changed display resource information sent by the electronic device, and refreshes and displays an application interface based on the changed display resource information. In other words, the application window loads the portrait layout of the application window in the portrait orientation to which the application is adapted, and does not need to load a landscape layout to which the application is not adapted. The application window of the application is switched to the landscape orientation for displaying, and the portrait layout may be loaded in the landscape orientation.

Figure 11A:
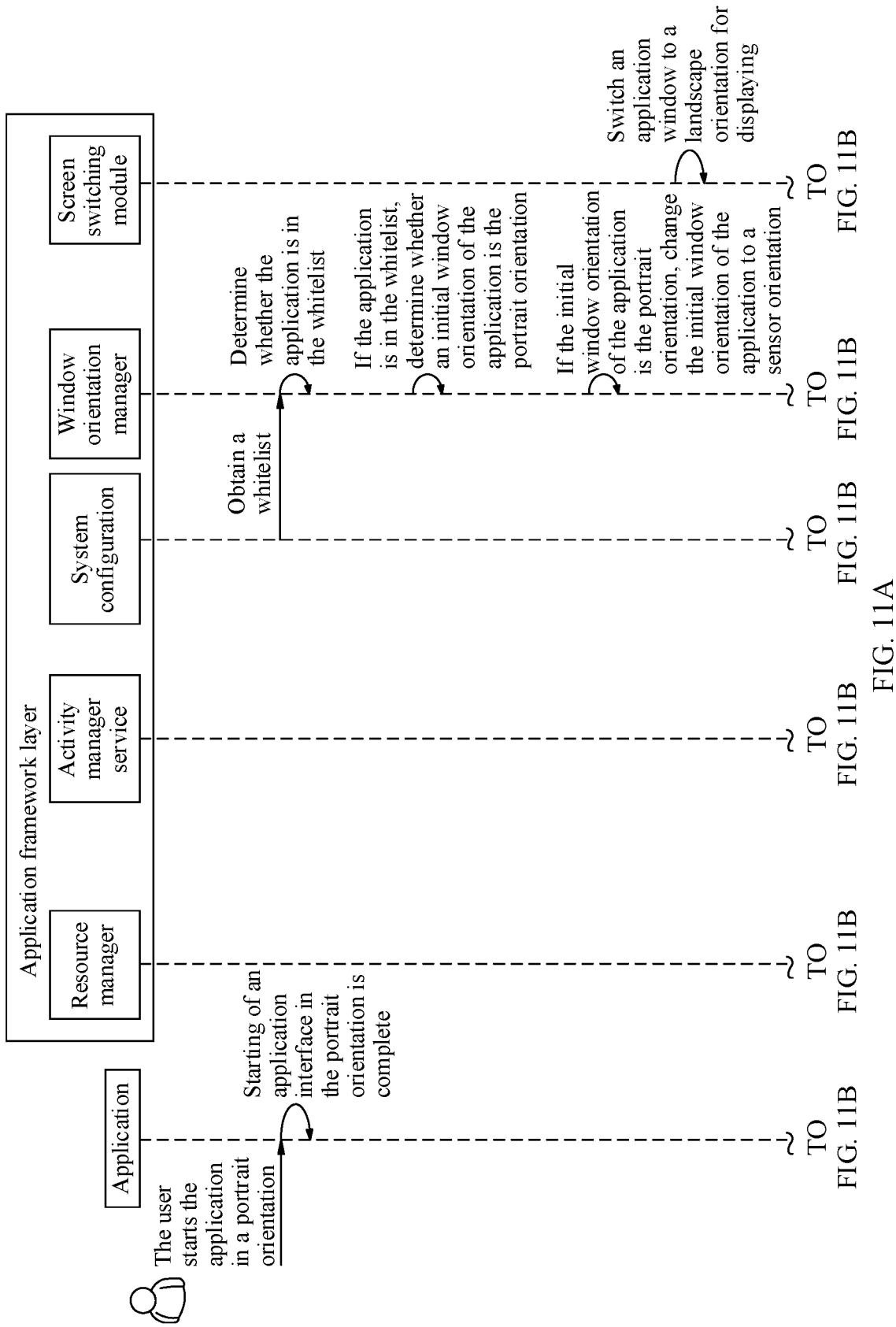
FIG. 11A and FIG. 11B are a schematic flowchart of another application display method according to an embodiment of this application.
Figure 11B:
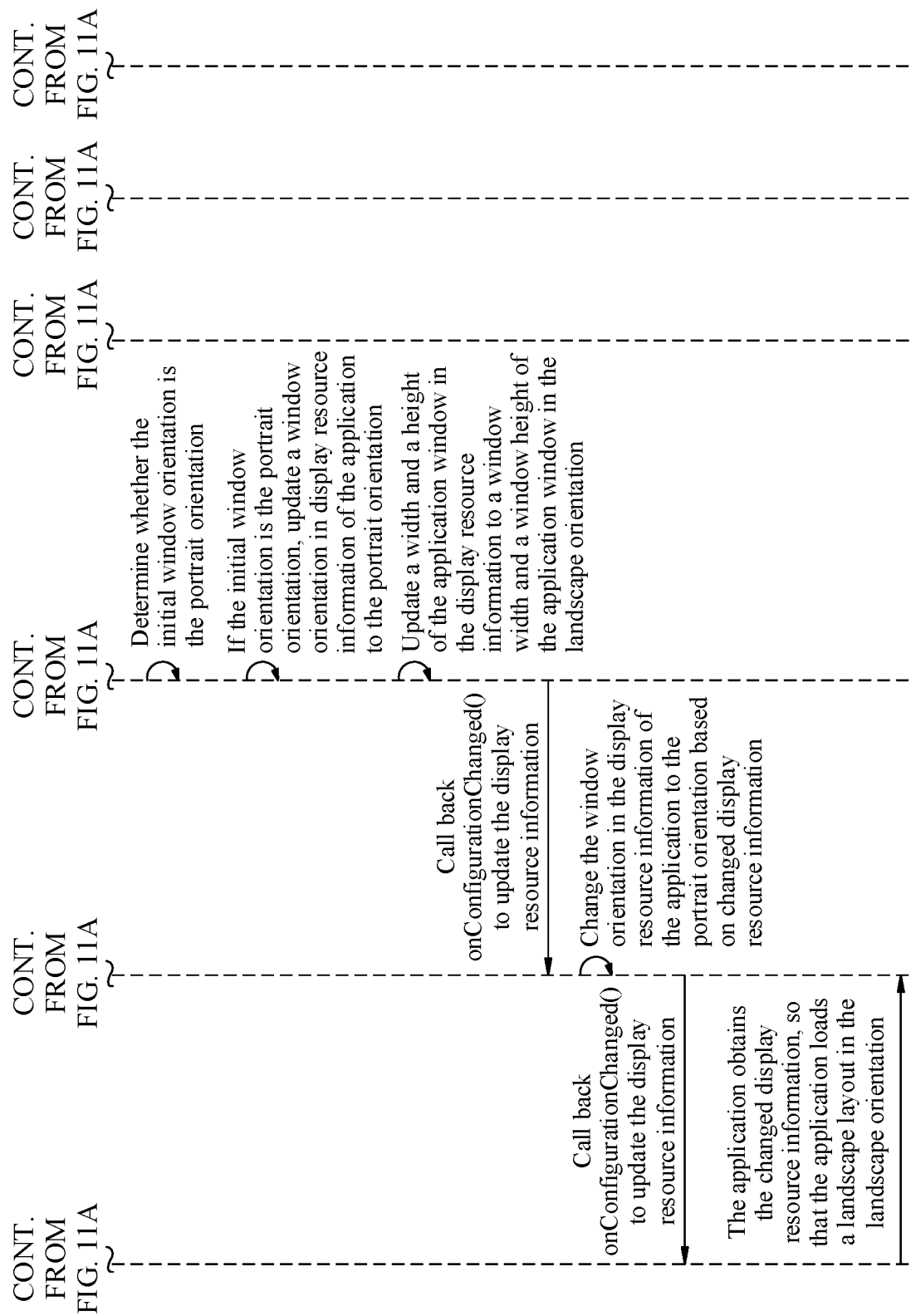

FIG. 11A and FIG. 11B are a schematic flowchart of an application display method according to an embodiment of this application. The application display method is applied to a system, and may be performed by a resource management module, an activity manager service, a system configuration, a window orientation manager, and a screen switching module in the system. A sequence of steps in the application display method may be changed, and some steps may be omitted.

In this embodiment of this application, the system configuration is used to store a whitelist, and not all applications need to support a display function provided in this embodiment of this application. An application supporting the display function provided in this embodiment of this application is controlled by the system whitelist. An application in the whitelist supports the display function provided in this embodiment of this application, and the application display method provided in this embodiment of this application may be used.

The electronic device may be in a portrait orientation or a landscape orientation, and a user starts an application on the electronic device. If the user starts the application in the portrait orientation, an application interface of the application is displayed in the portrait orientation. During starting of the application, a window orientation manager obtains a package name of the application from an activity manager service. The system configuration includes the corresponding application package name and a configuration of whether the display function provided in this embodiment of this application is supported. In other words, the whitelist in the system configuration includes the application package name configured for the display function provided in this embodiment of this application. The window orientation manager obtains the whitelist from the system configuration. The window orientation manager may determine, based on the package name of the application and the whitelist, whether the application supports the display function, that is, determine whether the package name of the application is in the whitelist. If the package name of the application is not in the whitelist, it is determined that the application is not in the whitelist, and the procedure of this application ends. If the package name of the application is in the whitelist, it is determined that the application is in the whitelist, and the procedure of this application continues.

In this embodiment of this application, triggering of obtaining the whitelist after the application may be started when the window orientation manager and the screen switching module collaboratively calculate whether to perform screen switching, or with reference to FIG. 4A and FIG. 4B, when the window orientation manager obtains a default orientation from the activity manager service, or when the window orientation manager obtains a dynamic orientation requested by the application from the activity manager service. The window orientation manager obtains an initial window orientation of the application, and before determining whether the initial window orientation of the application is the portrait orientation, the window orientation manager first determines whether the application is in the whitelist.

As shown in FIG. 4A and FIG. 4B, during starting of the application, the window orientation manager may obtain a default orientation of the application from the activity manager service, or when the application dynamically requests an orientation, the window orientation manager may obtain, from the activity manager service, the dynamic orientation requested by the application, and the window orientation manager determines an initial window orientation of the application window. When determining that the application is in the whitelist, the window orientation manager determines whether the initial window orientation of the application is the portrait orientation. If the initial window orientation of the application window is not the portrait orientation, it indicates that the application window supports displaying in the landscape orientation, and the application window is not processed according to this application.

The window orientation manager determines that the initial window orientation of the application is the portrait orientation, and the window orientation manager changes the initial window orientation of the application window to a sensor orientation.

After the initial window orientation of the application is changed to the sensor orientation, if the user inputs a switching operation of switching a screen orientation of the electronic device from the portrait orientation to the landscape orientation, for example, tapping a full-screen button or switching the electronic device from a portrait state to a landscape state, and a sensor detects data of the electronic device, the screen switching module detects the data monitored by the sensor. Further, after determining that a display orientation of the electronic device is changed from the portrait orientation to the landscape orientation, the screen switching module determines whether an orientation of a top window of the currently displayed application can be switched to the landscape orientation, and the screen switching module switches, based on the data monitored by the sensor and a current status of the electronic device, the application window to the landscape orientation for displaying. Because the initial window orientation is changed to the sensor orientation, the window in the portrait orientation can be freely switched to the landscape orientation.

When the screen switching module switches the application window to the landscape orientation for displaying, the screen switching module instructs, by using a callback, the application to refresh a layout. In a physical landscape orientation, that is, when the electronic device is in the landscape orientation, the layout of the application window in the portrait orientation may be refreshed, or the layout in the landscape orientation is refreshed. The electronic device switches from the portrait orientation to the landscape orientation, and performs a landscape/portrait rotation. When the electronic device is in the landscape orientation, the application window may have two window orientations: the landscape orientation and the portrait orientation. The application invokes a system API to control the window orientation of the application, and may be switched between the landscape orientation and the portrait orientation.

If the application supports the landscape orientation, the application dynamically requests the landscape orientation, that is, the application invokes a system API to request the landscape orientation. The application dynamically requests the landscape orientation from the activity manager service. The activity manager service sends changed display resource information to the resource manager by calling back onConfigurationChanged( ) for the requested dynamic orientation, and the resource manager sends the changed display resource information to the application by calling back onConfigurationChanged( ) so that the application refreshes and displays the application interface based on the changed display resource information, that is, the application interface loads the landscape layout in the landscape orientation.

If the application does not support the landscape orientation, the application does not request the landscape orientation, that is, the application does not invoke the system API to request the portrait orientation. A window orientation stored in the window orientation manager is the portrait orientation. The activity manager service determines whether the initial window orientation is the portrait orientation, and if the initial window orientation is the portrait orientation, updates the window orientation in the display resource information of the application to the portrait orientation. Specifically, the activity manager service controls a screen rotation value rotation in the display resource information to be 0 degrees, where the rotation equal to 0 degrees means the portrait orientation, and the rotation equal to 90 degrees means the landscape orientation. The activity manager service changes the screen orientation orientation in the display resource information to the portrait orientation. This ensures that window orientations in all system APIs returned to the application are the portrait orientation, to deceive the application into loading a portrait layout by using the window orientation as the portrait orientation.

When the screen switching module switches the application window to the landscape orientation for displaying, the activity manager service may obtain a width and a height of the window in the landscape orientation for the switched application window, and the activity manager service updates a width and a height in the display resource information of the application to the width and the height of the window in the landscape orientation.

The activity manager service sends changed display resource information to the resource manager by calling back onConfigurationChanged( ). After receiving the changed display resource information, the resource manager learns that the window orientation in the display resource information is the portrait orientation. The resource manager controls the screen rotation value rotation in the display resource information to be 0 degrees. This further ensures that the window orientations in all the system APIs returned to the application are the portrait orientation, to deceive the application into loading the portrait layout by using the window orientation as the portrait orientation.

The resource manager sends the changed display resource information to the application by calling back onConfigurationChanged( ). The application obtains the changed display resource information from the resource manager. The changed display resource information may include information such as a language, a font, density (pixel density), an actual window size and coordinates, the window orientation, and a screen size. The window orientation is the portrait orientation, and the width and the height of the application window are the width and the height in the landscape orientation. After obtaining the display resource information, the application refreshes the layout, and loads the portrait layout in the landscape orientation. In this case, the electronic device refreshes and displays the application interface in the landscape state.

In this embodiment of this application, an application window that does not support the landscape orientation can be freely displayed in the landscape orientation according to the technical solution in the system.

Figure 12:
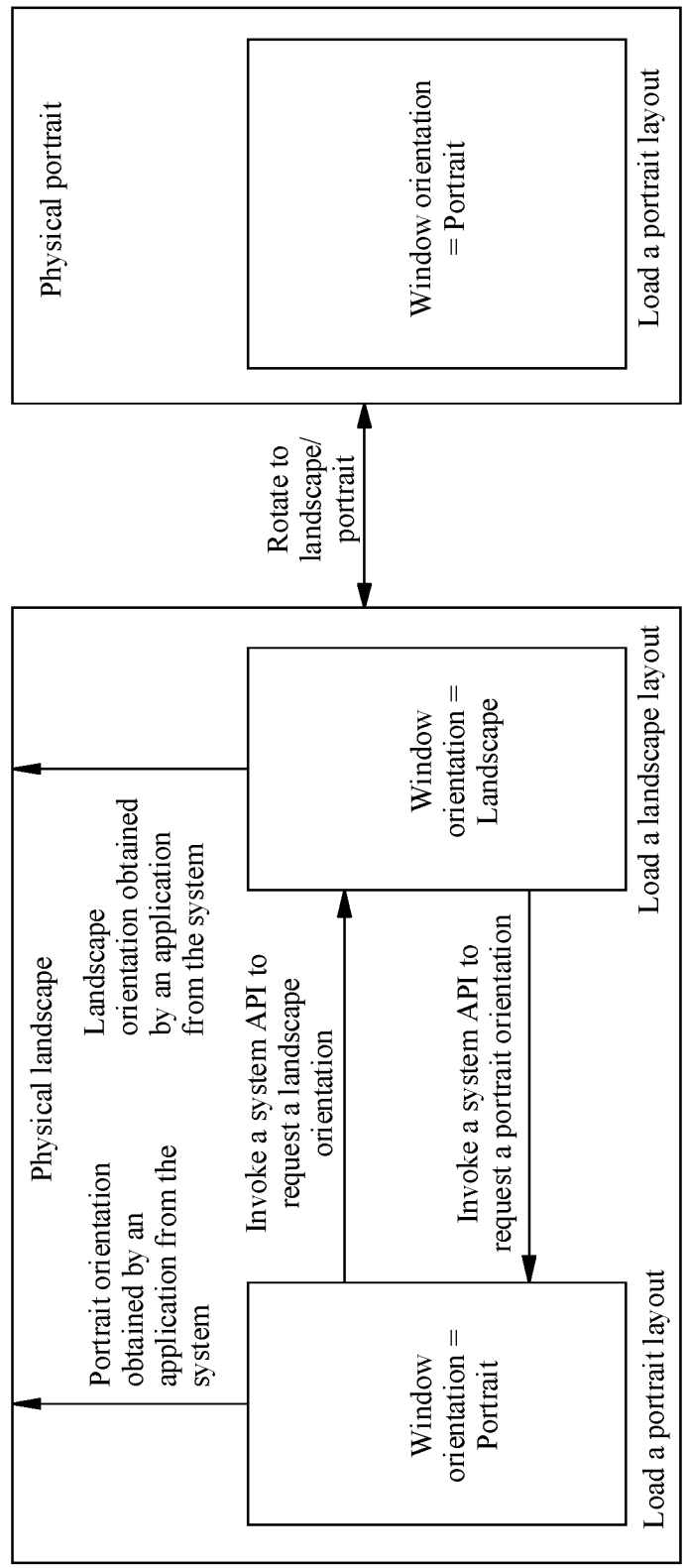
FIG. 12 is a schematic diagram of an application display scenario according to an embodiment of this application.

As shown in FIG. 12, the electronic device is in a physical portrait orientation, that is, the electronic device is in the portrait orientation, and the application window loads the portrait layout. The user rotates the electronic device from the portrait orientation to the landscape orientation, and the electronic device is in a physical landscape orientation, that is, the electronic device is in a landscape state, and the electronic device is in the landscape orientation. In the physical landscape orientation, the application window may have the following window orientations: the landscape orientation and the portrait orientation. When the application invokes a system API to control the window orientation, the application may switch between the landscape orientation and the portrait orientation. For example, if the window orientation of the application window is the portrait orientation, after the screen is switched to the landscape orientation, the window orientation of the application window is still the portrait orientation, and the system loads the portrait layout. In this case, the application window invokes a system API to request the landscape orientation, and the window orientation is changed to the landscape orientation. In this case, a window orientation returned by the system to the application window is the landscape orientation, and the application loads the landscape layout. Similarly, in the physical landscape orientation, when the application window orientation is the landscape orientation, if the application window invokes an API to request the portrait orientation, the application window orientation is changed to the portrait orientation, a window orientation returned by the system to the application window is the portrait orientation, and the application loads the portrait layout.

It is clear that, for a person skilled in the art, this application is not limited to details of the foregoing example embodiments, and this application can be implemented in other specific forms without departing from the spirit or basic features of this application. Therefore, appropriate modifications and variations made to the foregoing embodiments without departing from the spirit and essence of this application shall fall within the protection scope of this application.

What is claimed is:

1. An application display method, comprising:
    starting an application on an electronic device; detecting a switching operation of switching
    a screen orientation of the electronic device from a portrait orientation to a landscape orientation;
    in response to detecting the switching operation, changing a window orientation of display resource information of the application to the portrait orientation; and
    sending the changed display resource information to the application, so that the application loads a portrait layout of an application window in the landscape orientation,
    wherein the changing the window orientation of the display resource information of the application to the portrait orientation comprises:
    changing, by an activity manager service in an application framework layer of the electronic device, the window orientation of the display resource information of the application to the portrait orientation; and
    sending the changed display resource information to a resource manager in the application framework layer of the electronic device, so that the application obtains the changed display resource information from the resource manager.

2. The application display method according to claim 1, wherein changing the window orientation of the display resource information of the application to the portrait orientation comprises: in response to detecting the switching operation, switching the application window of the application to the landscape orientation for displaying.

3. The application display method according to claim 1, further comprising, before changing the window orientation of the display resource information of the application to the portrait orientation: determining whether an initial window orientation of the application is the portrait orientation; and in response to a determination that the initial window orientation is in the portrait orientation, changing the initial window orientation to a sensor orientation, so that the application window of the application is controlled to follow the screen orientation for displaying.

4. The application display method according to claim 3, further comprising: after starting the application on the electronic device: determining whether the application is in a preset whitelist; and in response to a determination that the application is in the preset whitelist, obtaining the initial window orientation of the application.

5. The application display method according to claim 1, wherein the changing the window orientation of the display resource information of the application to the portrait orientation comprises: determining whether an initial window orientation of the application is the portrait orientation; and in response to a determination that the initial window orientation is in the portrait orientation based on the determining, changing the window orientation in the display resource information of the application to the portrait orientation.

6. The application display method according to claim 1, wherein changing, by the activity manager service in the application framework layer of the electronic device, the window orientation in the display resource information of the application to the portrait orientation comprises: changing, by the activity manager service in the application framework layer of the electronic device, a screen rotation value of the display resource information of the application to 0 degrees; and changing the screen orientation of the display resource information of the application to the portrait orientation.

7. The application display method according to claim 1, wherein the changing the window orientation of the display resource information of the application to the portrait orientation further comprises: changing, by the resource manager in the application framework layer of the electronic device, the window orientation in the display resource information of the application to the portrait orientation.

8. The application display method according to claim 7, wherein changing, by the resource manager in the application framework layer of the electronic device, the window orientation in the display resource information of the application to the portrait orientation comprises: changing, by the resource manager in the application framework layer of the electronic device, a screen rotation value in the display resource information of the application to 0 degrees.

9. The application display method according to claim 1, wherein: the display resource information comprises a width and a height of an application window; and the method further comprises, before sending the changed display resource information to the application: updating the width and the height of the application window of the display resource information to a window width and a window height of the application window in the landscape orientation.

10. The application display method according to claim 1, wherein the electronic device is foldable.

11. An electronic device, comprising:
a processor; and
a memory coupled to the processor with program code stored thereon, wherein the processor is configured to invoke the program code to enable the electronic device to perform the following steps:
starting an application on the electronic device;
detecting a switching operation of switching a screen orientation of the electronic device from a portrait orientation to a landscape orientation;
in response to detecting the switching operation, changing a window orientation of display resource information of the application to the portrait orientation;
sending the changed display resource information to the application, so that the application loads a portrait layout of an application window in the landscape orientation,
changing, by an activity manager service in an application framework layer of the electronic device, the window orientation of the display resource information of the application to the portrait orientation; and
sending the changed display resource information to a resource manager in the application framework layer of the electronic device, so that the application obtains the changed display resource information from the resource manager.

12. The electronic device according to claim 11, wherein the program code further enables the electronic device to perform: switching, in response to detecting the switching operation, the application window of the application to the landscape orientation for displaying.

13. The electronic device according to claim 11, wherein the program code further enables the electronic device to perform: determining whether an initial window orientation of the application is the portrait orientation; and in response to a determination that the initial window orientation of the application is the portrait orientation, changing the initial window orientation to a sensor orientation, so that the application window of the application is controlled to follow the screen orientation for displaying.

14. The electronic device according to claim 11, wherein the program code further enables the electronic device to perform: determining whether an initial window orientation of the application is the portrait orientation; and in response to a determination that the initial window orientation of the application is the portrait orientation, changing the window orientation of the display resource information of the application to the portrait orientation.

15. The electronic device according to claim 11, wherein the program code further enables the electronic device to perform: changing, by the activity manager service in the application framework layer of the electronic device, a screen rotation value of the display resource information of the application to 0 degrees; and changing the screen orientation in the display resource information of the application to the portrait orientation.

16. The electronic device according to claim 11, wherein the electronic device is further enabled to perform: determining whether the application is in a preset whitelist; and in response to a determination that the application is in the preset whitelist, obtaining an initial window orientation of the application.

17. An electronic device, comprising:
a processor; and
a memory coupled to the processor with program code stored thereon, wherein the processor is configured to invoke the program code to enable the electronic device to perform the following steps:
starting an application on the electronic device;
detecting a switching operation of switching a screen orientation of the electronic device from a portrait orientation to a landscape orientation;
in response to detecting the switching operation, changing a window orientation of display resource information of the application to the portrait orientation; and
sending the changed display resource information to the application, so that the application loads a portrait layout of an application window in the landscape orientation, wherein the changed display resource information comprises a window width and a window height of the application window in the landscape orientation;
changing, by an activity manager service in an application framework layer of the electronic device, the window orientation in the display resource information of the application to the portrait orientation; and
sending the changed display resource information to a resource manager in the application framework layer of the electronic device, so that the application obtains the changed display resource information from the resource manager.

* * * * *